(12) United States Patent
Daugherty

(10) Patent No.: US 11,600,302 B2
(45) Date of Patent: Mar. 7, 2023

(54) SYSTEM AND METHODS FOR AUTONOMOUS SYNCHRONOUS RENDERING OF MEDIA OBJECTS OBTAINED FROM A PLURALITY OF MEDIA SOURCES

(71) Applicant: Evolve Media AI Corporation, New Orleans, LA (US)

(72) Inventor: Stephen Michael Daugherty, New Orleans, LA (US)

(*) Notice: Subject to any disclaimer, the term of this patent is extended or adjusted under 35 U.S.C. 154(b) by 0 days.

(21) Appl. No.: 17/503,308

(22) Filed: Oct. 16, 2021

(65) Prior Publication Data

US 2022/0262406 A1 Aug. 18, 2022

Related U.S. Application Data

(60) Provisional application No. 63/066,298, filed on Aug. 16, 2020.

(51) Int. Cl.

| | |
|---|---|
| *G11B 27/036* | (2006.01) |
| *G06V 20/40* | (2022.01) |
| *G10L 25/51* | (2013.01) |
| *G11B 27/031* | (2006.01) |
| *G11B 27/28* | (2006.01) |
| *G11B 27/10* | (2006.01) |

(52) U.S. Cl.
CPC ............ *G11B 27/036* (2013.01); *G06V 20/41* (2022.01); *G10L 25/51* (2013.01); *G06V 2201/10* (2022.01)

(58) Field of Classification Search
USPC .................................................. 386/278–290
See application file for complete search history.

(56) References Cited

U.S. PATENT DOCUMENTS

| | | | |
|---|---|---|---|
| 10,381,022 B1 * | 8/2019 | Chaudhuri | G10L 25/57 |
| 11,297,027 B1 * | 4/2022 | Agrawal | G06F 3/0482 |

* cited by examiner

*Primary Examiner* — Hung Q Dang
(74) *Attorney, Agent, or Firm* — Marin Patents LLC; Gustavo Marin

(57) ABSTRACT

Systems and methods for autonomous rendering of synchronous media objects are disclosed. The system may obtain unsynchronized media objects from user devices and initialize a media object analysis procedure for each media object by collecting metadata associated with each media object and determine a plurality of labels for each media object based on the collected metadata. Further, the system may execute audio analysis for at least one audio track associated with each media object to determine an audio score. The system may then select a best audio track corresponding to each media object based on the audio scores and create a narrative sequence comprising of media object slots filled with media objects and corresponding best audio tracks for each media object. Furthermore, based on approval of the narrative sequence by a user device, the system may generate a synchronized media object preview for display on the user device.

14 Claims, 14 Drawing Sheets

SYSTEM AND METHODS FOR AUTONOMOUS SYNCHRONOUS RENDERING OF MEDIA OBJECTS OBTAINED FROM A PLURALITY OF MEDIA SOURCES

CROSS-REFERENCE TO RELATED APPLICATIONS

This application claims the benefit of, and priority to, U.S. provisional patent application No. 63/066,298 filed on Aug. 16, 2020, and titled, "VIDEO FUSION SYSTEM AND METHOD", the entire specification of which is incorporated herein by reference.

BACKGROUND OF THE INVENTION

Field of the Art

The disclosure relates to the field of rending digital media, and more particularly to the field of rending a combination of media object segment sources from a plurality of user devices based on metadata and media analysis.

Discussion of the State of the Art

Systems and methods known in the art are limited editing a raw collection of footage with no added intelligence. Further such combinations of media objects, e.g., videos require a substantive amount of human effort and skill to edit video segments in a coherent and time-sequenced fashion. It is difficult, if not impossible, to organize and edit video segments from a plurality of user device while understanding that more than one segment may comprise the same object or subject for a presentation comprising, for example, different angles, a better audio track, or a better presentation for a specific object or subject in a video segment.

What is needed in the art are systems and methods to receive independently sourced media object segments (e.g., frames of videos) from a plurality of media capture sources and automatically create a resultant synchronized media object based on a length, time, and/or a specific goal in mind (for example, a resultant video based on a specific object or subject found within frames, location of video sources, and the like).

SUMMARY OF THE INVENTION

Accordingly, the inventor has conceived and reduced to practice, in a preferred embodiment of the invention, a video segment rendering system comprising a plurality of computing devices operable to receive a plurality of video segments from a plurality of video capture devices such as user devices, drones, security cameras, or other internet of things (IoT) devices. Systems and methods disclosed herein are further operable to receive, or in some embodiments assign, metadata describing aspects of video segments for example, GPS coordinates, angles, distance information, configured elements such as objects/subjects within video. Further, systems and methods may perform an analysis of video segments to automatically create a resultant video based on the analysis whereby the resultant video can be based on metadata or the analysis, or a combination thereof.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

Figure 9:
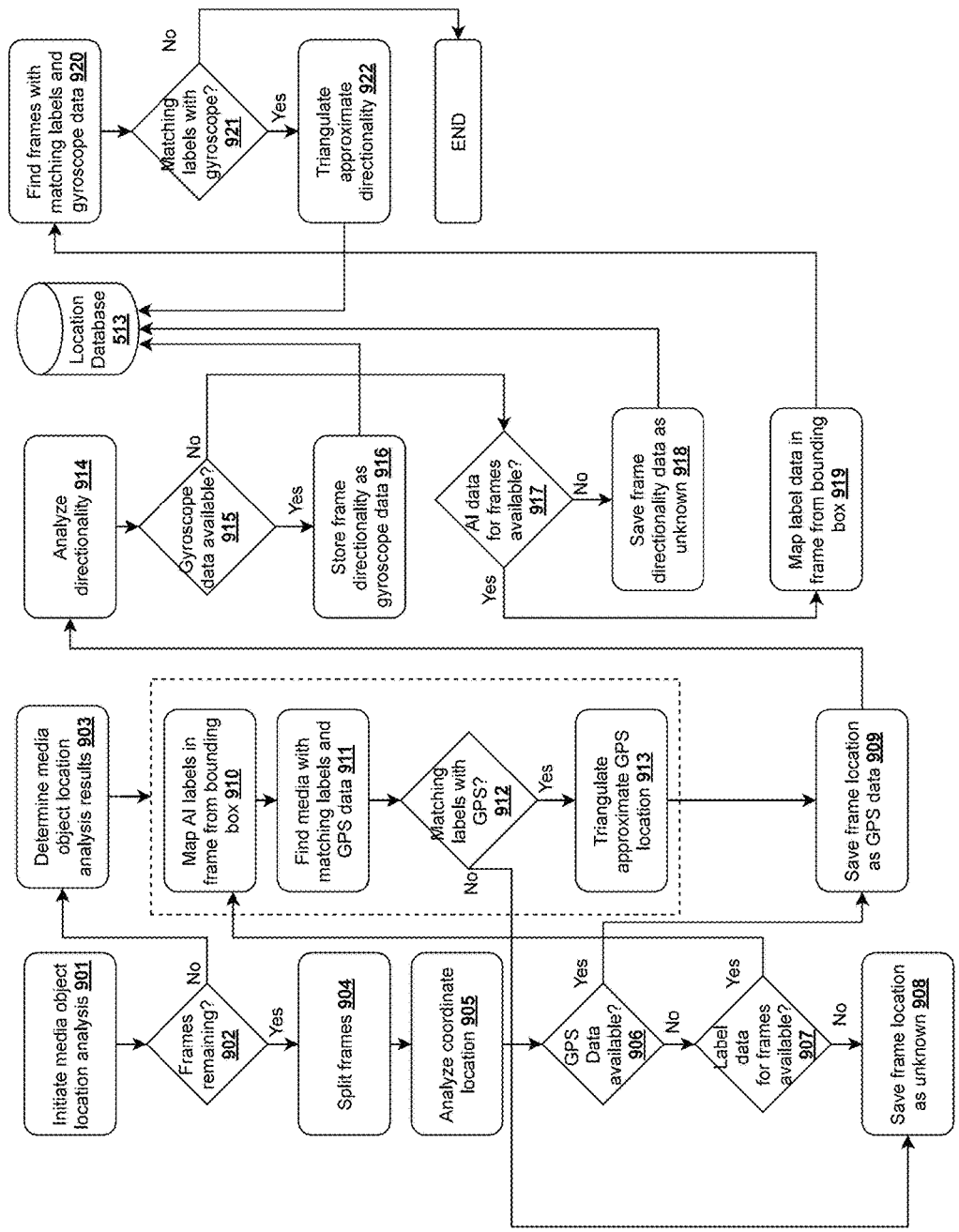

FIG. 9 a flow diagram illustrating a spatial analysis for the media objects, according to a preferred embodiment of the invention.

Figure 10:
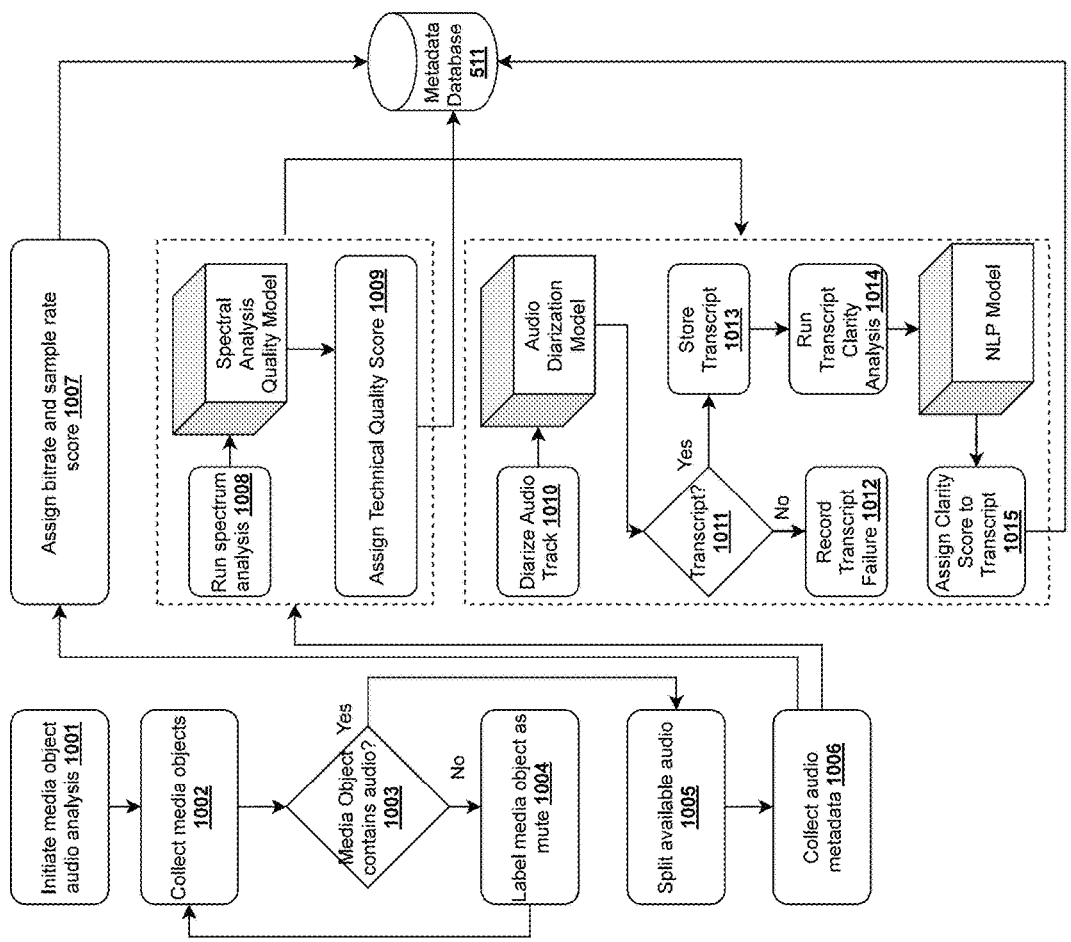

FIG. 10 is a flow diagram illustrating a method for audio analysis for the media objects, according to a preferred embodiment of the invention.

Figure 11:
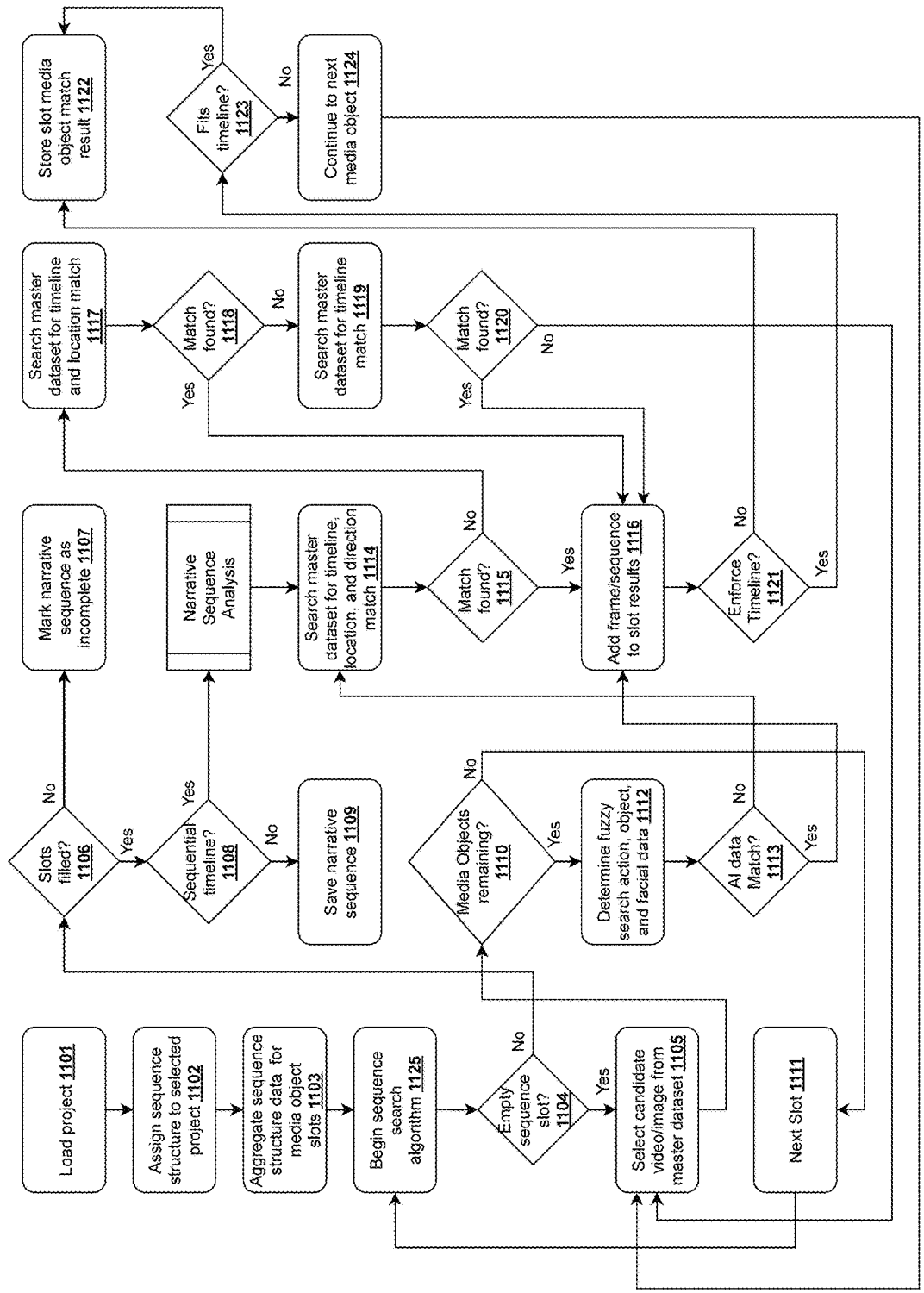

FIG. 11 is a flow diagram illustrating a method for creating a narrative sequence comprising one or more synchronized media objects, according to a preferred embodiment of the invention.

Figure 12:
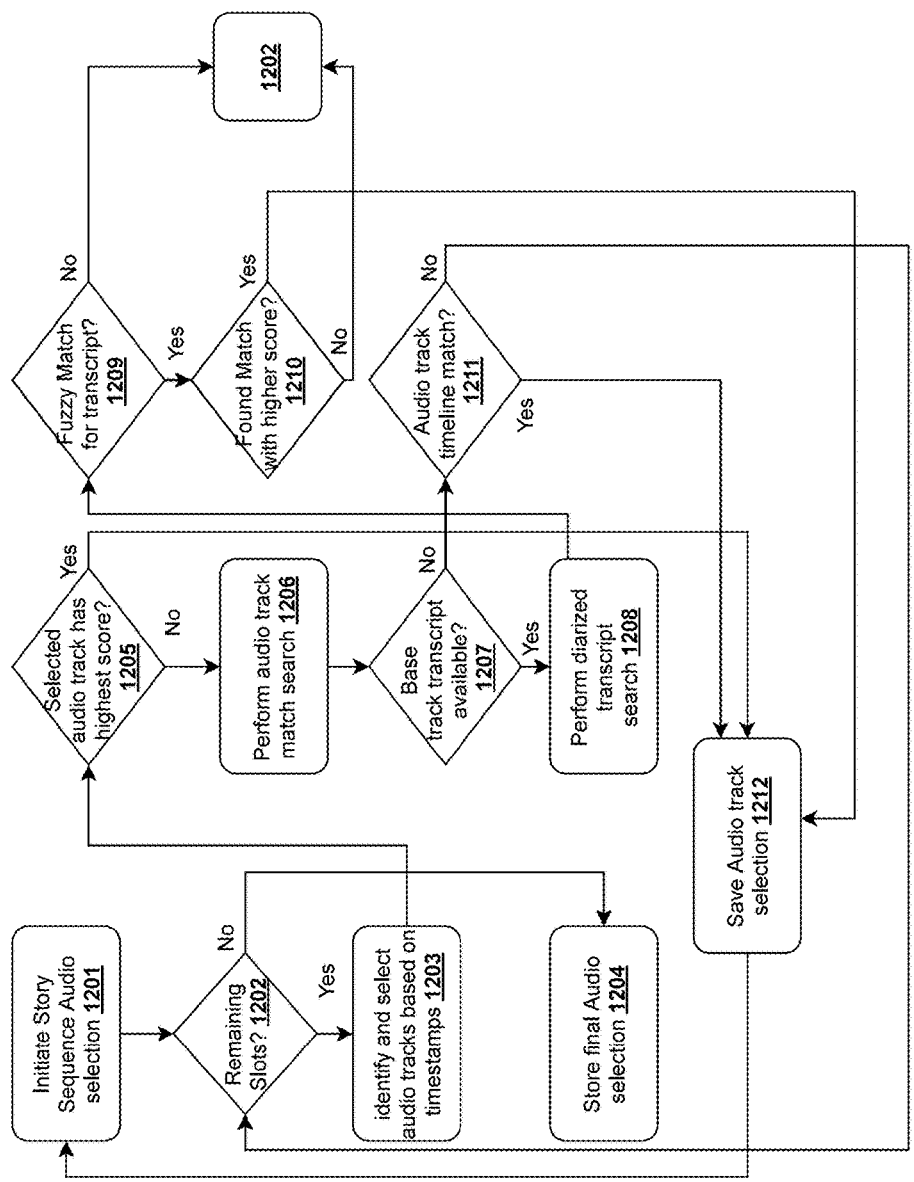

FIG. 12 is a flow diagram illustrating a method for audio selection and correlation for the media objects, according to a preferred embodiment of the invention.

Figure 13:
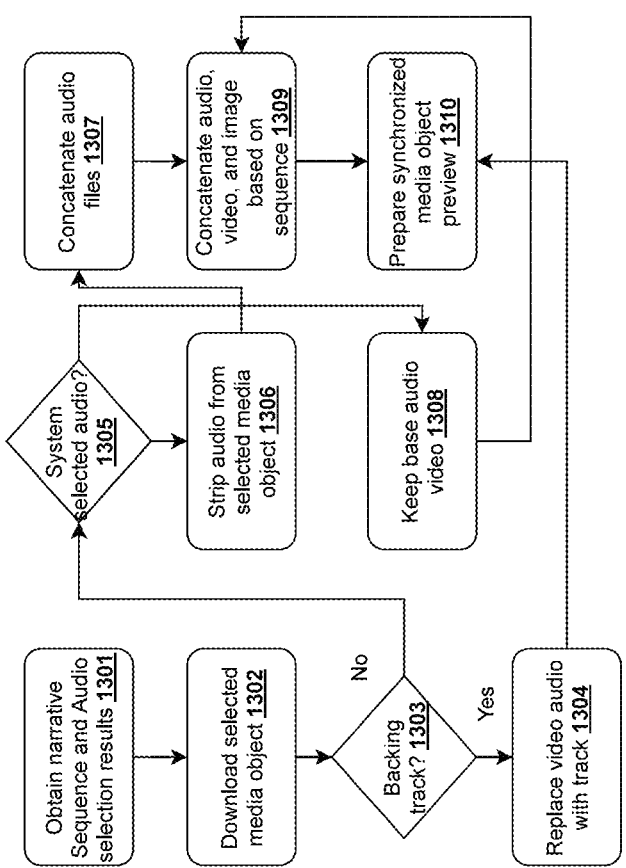

FIG. 13 is a flow diagram illustrating a method for creating an editable preview comprising at least a synchronized media object, according to a preferred embodiment of the invention.

Figure 14:
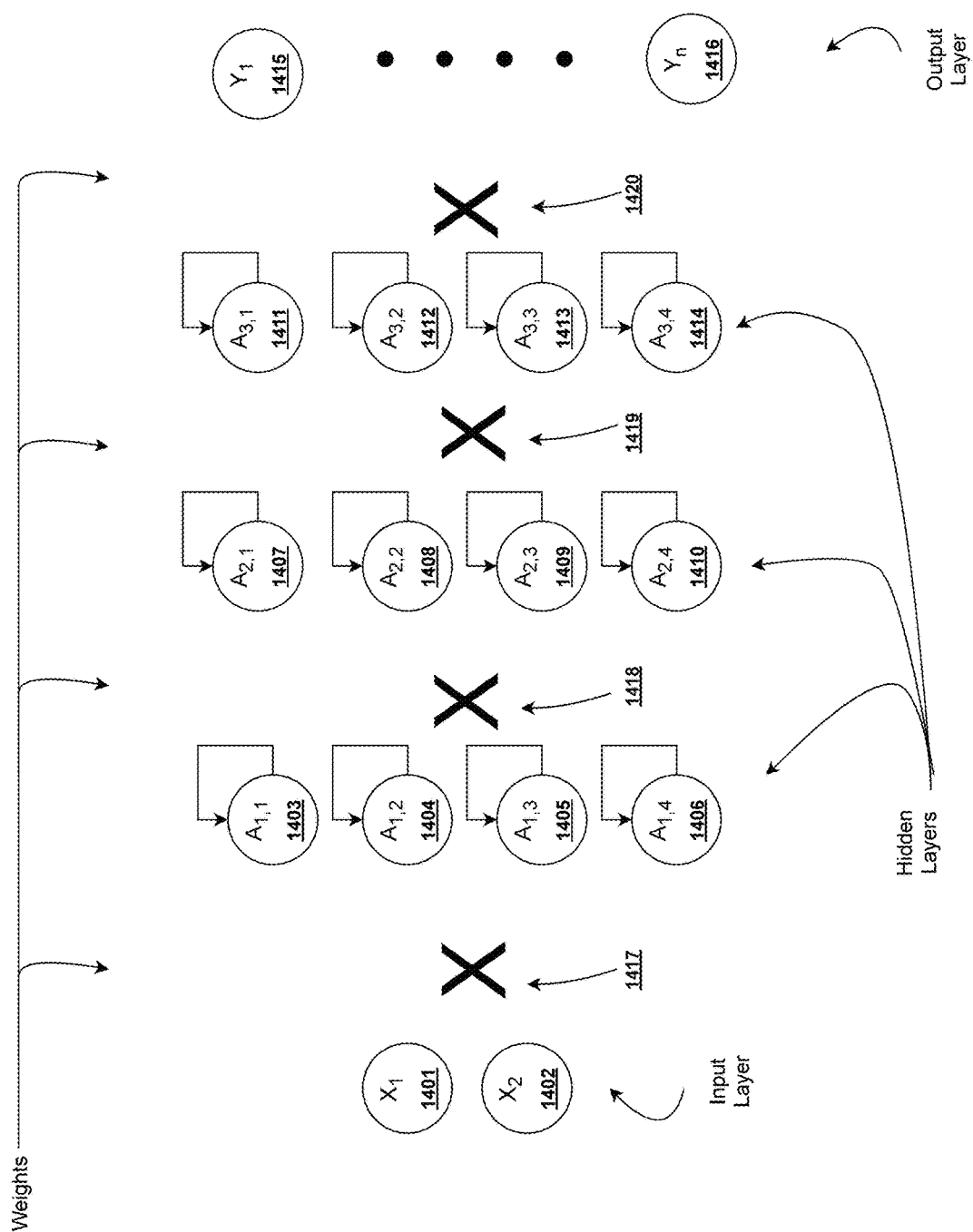

FIG. 14 is a flow diagram illustrating an exemplary neural network for determining elements comprised within a plurality of media object segments in accordance with some embodiments of the invention.

DETAILED DESCRIPTION

The inventor has conceived, and reduced to practice, systems and methods for rending a combination of video segment sources from a plurality of user devices based on metadata and video segment analysis.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
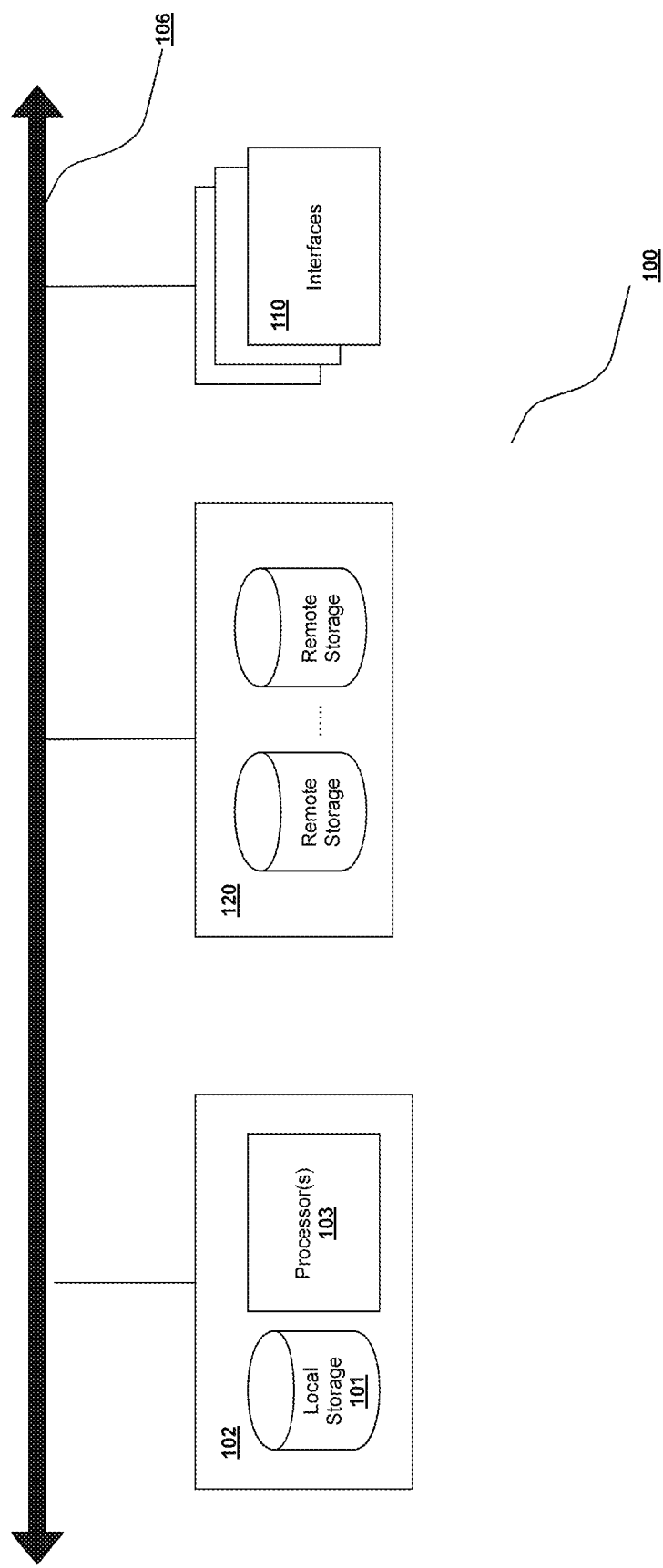
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON' or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a subscriber device 513 (such as a tablet device or smartphone running client software) and server systems (such as a server system described in more detail below). Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
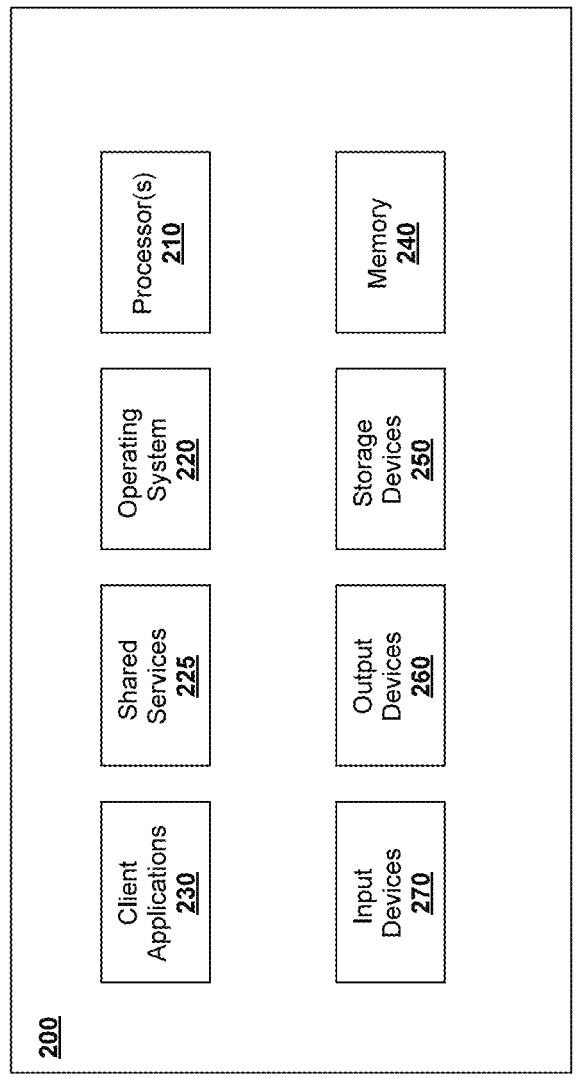
FIG. 2 is a block diagram illustrating an exemplary logical architecture for a client device, according to an embodiment of the invention.

In some embodiments, systems according to the present invention may be implemented on a standalone computing system. Referring now to FIG. 2, a block diagram depicting a typical exemplary architecture of one or more embodiments or components thereof on a standalone computing system is shown. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
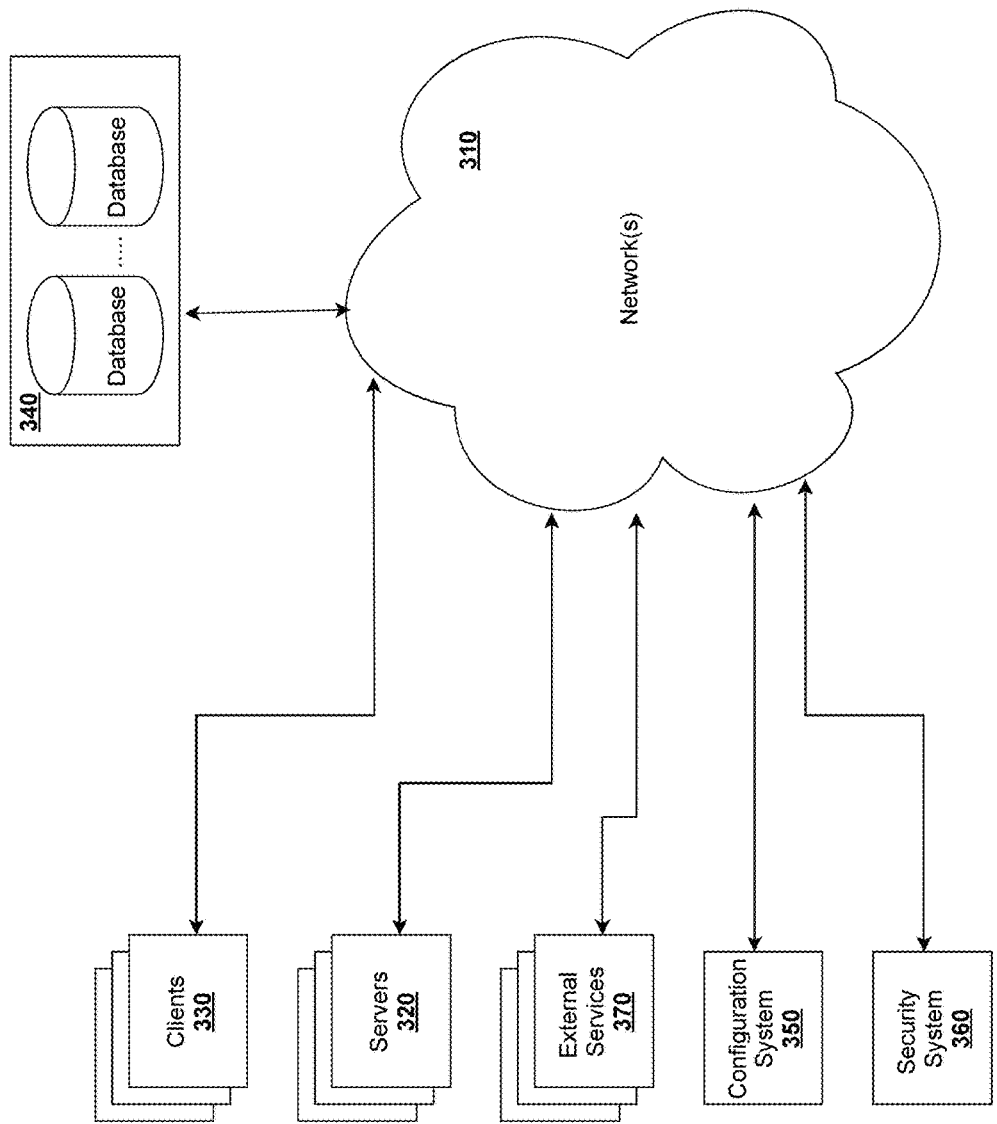
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, a block diagram depicting an exemplary architecture 300 for implementing at least a portion of a system according to an embodiment of the invention on a distributed computing network is shown. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to receive additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may receive information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
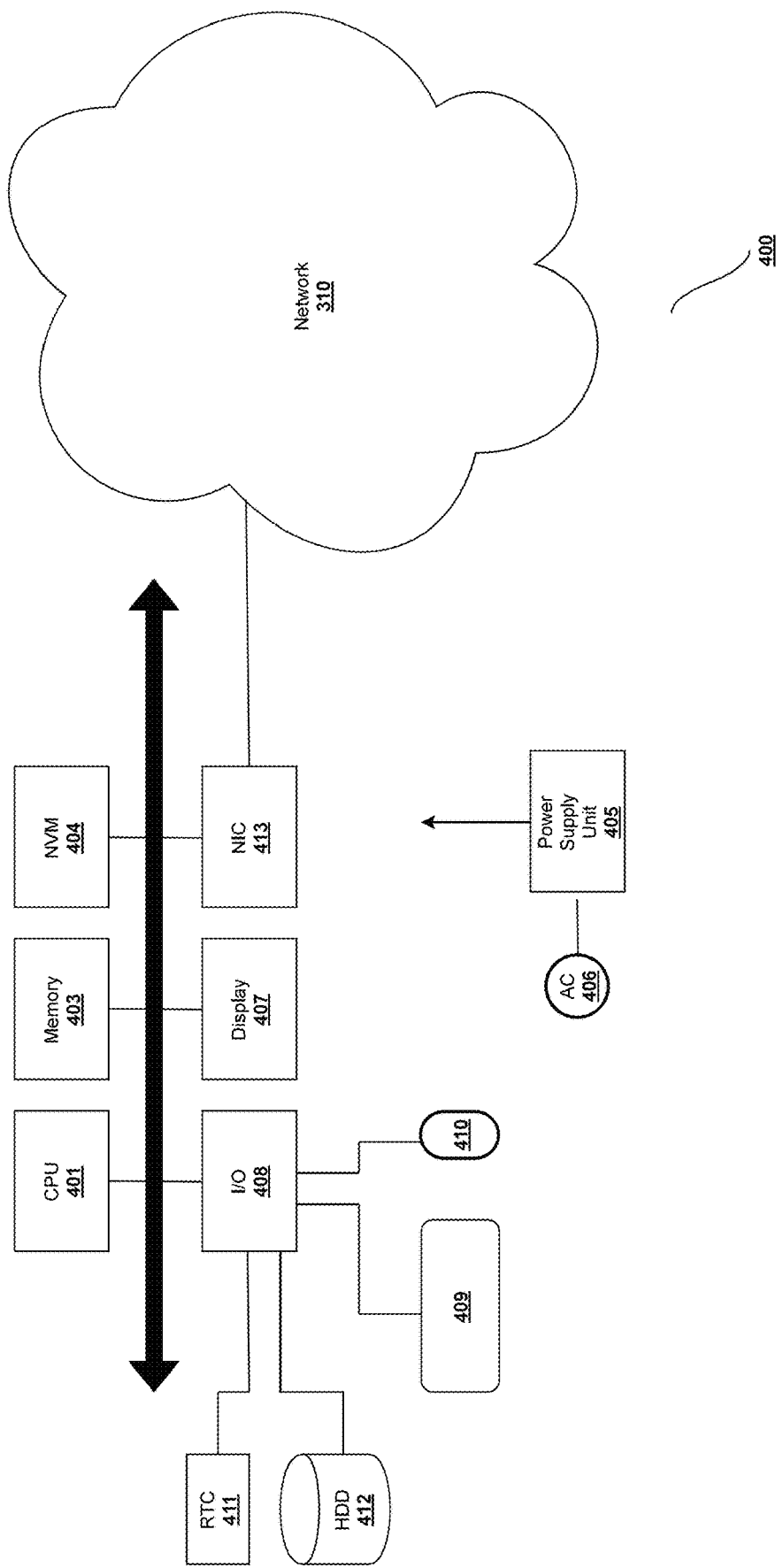
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
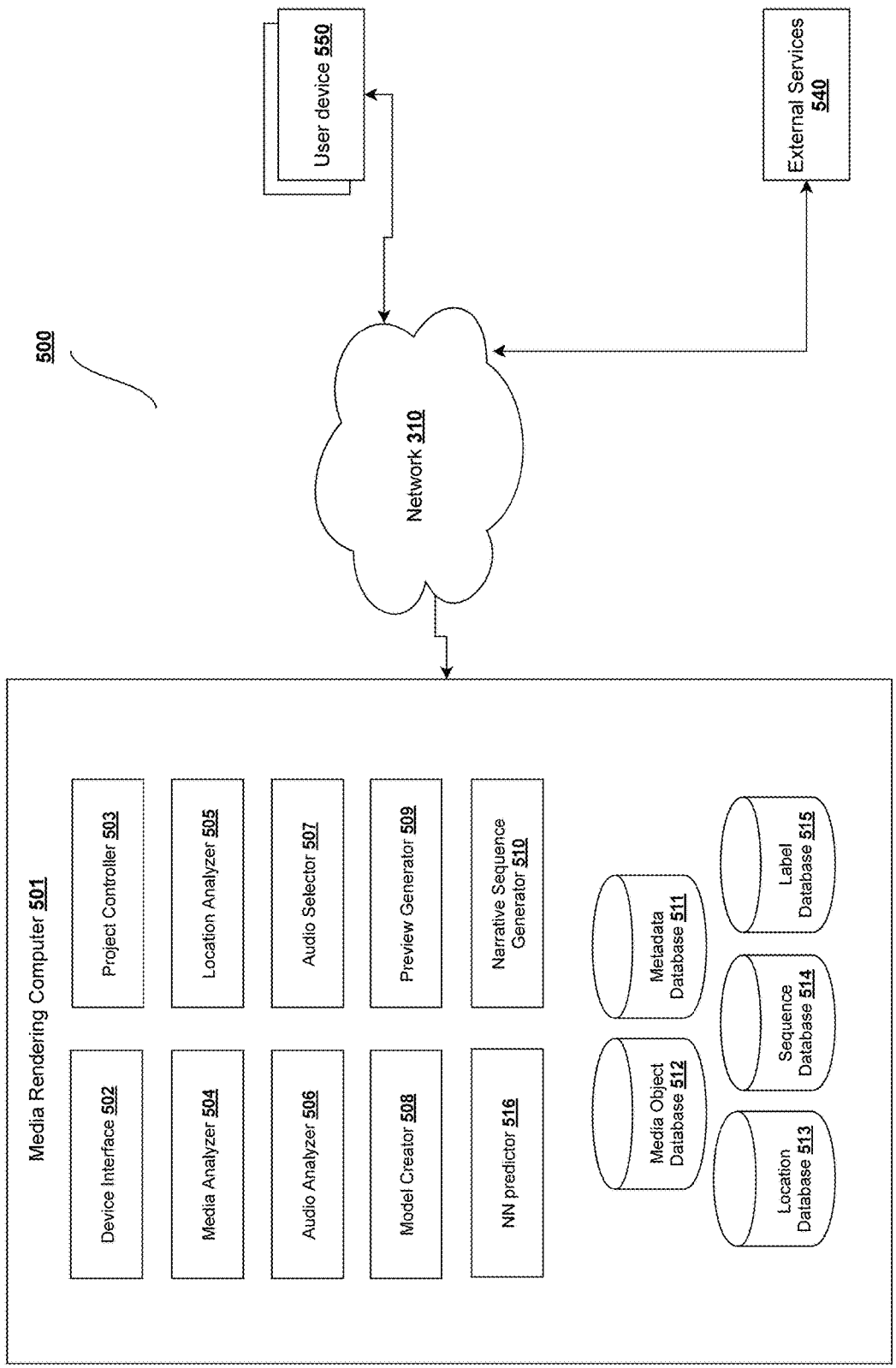
FIG. 5 is a block diagram illustrating an exemplary conceptual architecture of a media object rendering computer, according to a preferred embodiment of the invention.

FIG. 5 is a block diagram of an exemplary system architecture 500 for operating media rendering computer 501, according to a preferred embodiment of the invention. According to the embodiment, media rendering computer 501, in communication with a plurality of user devices 550, may comprise a plurality of programming instructions stored in a memory and operating on a processor of a network-connected computing device, and may be configured to communicate via network 310 such as the Internet or other data communication network. For example, communication control computer 501 may be configured to communicate via a cloud-based protocol to receive media objects from a plurality of user devices 550, such as to enable one or more users to interact with media rendering computer 501 via a web browser, another software application, or a specially programmed user computer. For example, media rendering computer 501 may utilize network 310 for creation of a synchronized media object using one or more projects created at the media rendering computer 501, each project comprising a plurality of media objects sourced from different user devices 550 in real-time or near-real time (as described in FIG. 7).

In some embodiments, media rendering computer 501 may further comprise device interface 502; project controller 503; media analyzer 504; location analyzer 505; audio analyzer 506; audio selector 507; model creator 508; preview generator 509; and narrative sequence generator 510. Further, media rendering computer 501 may comprise of one or more databases including metadata database 511; media object database 512; location database 513; sequence database 514; and label database 515.

In operation, project controller 503 may create a project inviting one or more user devices 550 to join said project. In an embodiment, a user device 550 may join a project by scanning a QR code displayed at device interface 502 and/or accepting an invite via email or a software application running on the user device 550. In an embodiment, for each project user devices 550 may upload media objects to a master dataset, as described in FIG. 7.

In an embodiment, each media object referred to herein, unless otherwise specified, may refer to unsynchronized media objects, i.e., individual media objects uploaded to the media rendering computer 501 such that the media rendering computer 501 may analyze and process the unsynchronized media objects using systems and methods disclosed herein, to create a single synchronized media object for display and playback to one or more user devices 550. For the sake of brevity, unsynchronized media objects are herein simply referred to as media objects.

Figure 8:
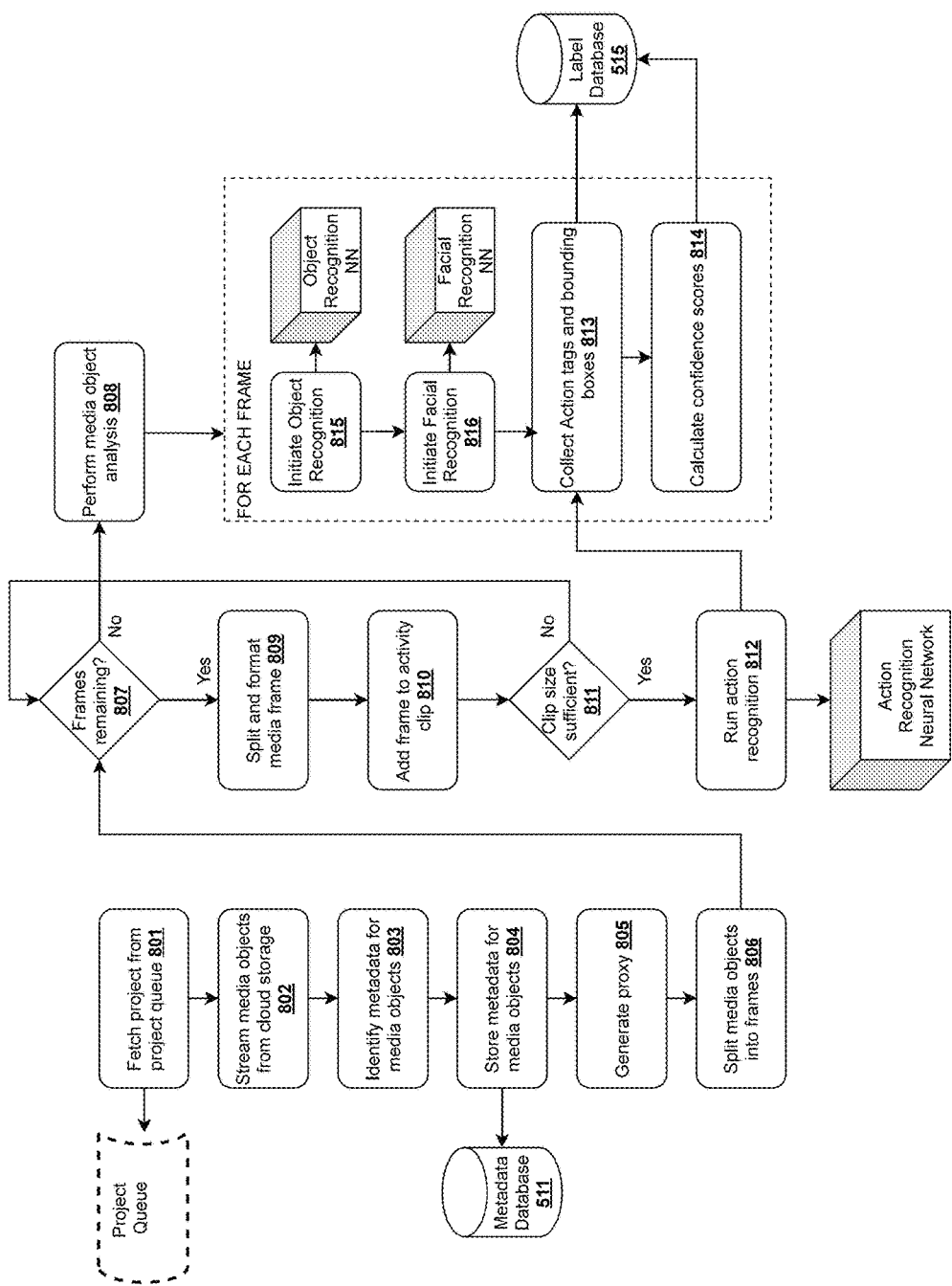
FIG. 8 is a flow diagram illustrating a method for media object analysis, according to a preferred embodiment of the invention.

After media objects have been uploaded, media analyzer 504 may determine metadata (stored in metadata database 511) for each media object and analyze each media object including analysis to determine data associated such as action recognition, object recognition, and facial recognition, as described in detail in FIG. 8. In an embodiment, media analyzer 504 may store results from media object analysis within media object database 512.

In an embodiment, based on the analysis of each media object, audio analyzer 506 may perform an audio analysis to determine an audio score for each audio track associated with each media object, based on technical metadata associated with each audio track, as described in FIG. 10.

In another embodiment, location analyzer 505 may perform spatial analysis for each frame of each media object in order to determine GPS data, gyroscope data, and directionality data associated therewith, as described in detail with FIG. 9. Based on the spatial analysis and audio analysis, audio selector 507 may select the best audio track for a final synchronized media object, as described in detail with respect to FIG. 13. In an embodiment, location analyzer 505 may store GPS data, gyroscope data, and directionality data in location database 513.

In an embodiment, based on the media object, spatial, and audio analyses, narrative sequence generator 510 may generate a narrative sequence by loading a project template defining empty temporal media object slot as well as aesthetic considerations, such as relevant background audio tracks, title cards, and transitions. Further, narrative sequence generator 510 may assign a sequence structure which may be filled by possible matches of media objects from the master dataset, as described in FIG. 11. In an embodiment, results from the media object, spatial, and audio analyses may be stored in label database 515. Further, the narrative sequences may be stored in sequence database 514.

In another embodiment, preview generator 509 may create a synchronized media object preview for user device 550, wherein the synchronized media object preview may allow user devices 550 to view and approve a final media object comprising high quality synchronized media objects, along with the best selected audio tracks and other project template additions. In the embodiment, user devices 550 may either approve the synchronized media object preview or upload more media objects to add or modify the synchronized media object preview generated by preview generator 509, as described in FIG. 13.

In yet another embodiment, model creator 508 may train an object recognition neural network to recognize one or more objects relevant to the project as dictated by their corresponding project template. Further, model creator 508 may also train a facial recognition model to recognize human facial data from one or more frames of media objects. In an embodiment, model creator 508 may also train an LSTM network to identify diarized text from audio tracks of varying clarity levels to allow for a selection of the best audio track for the synchronized media object. Exemplary neural networks are further described in FIG. 14.

Detailed Description of Exemplary Embodiments

Figure 6:
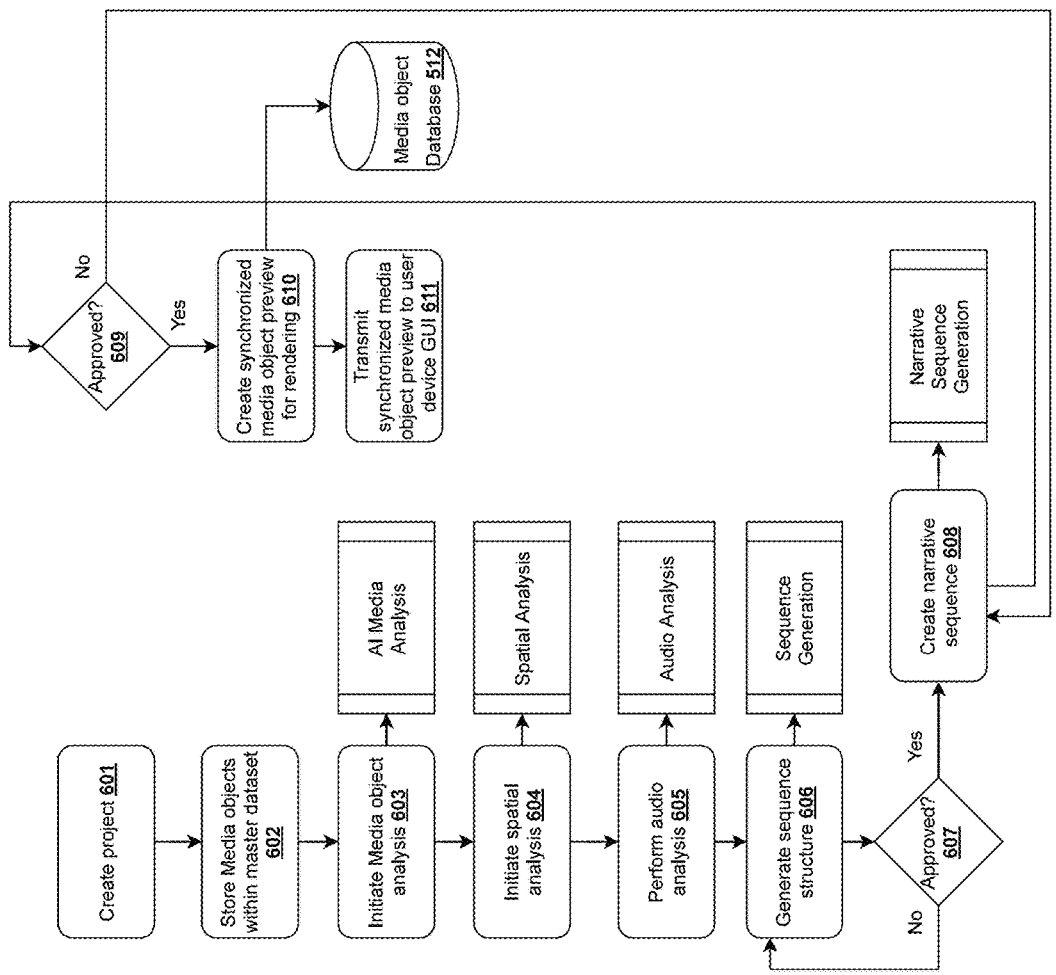
FIG. 6 is a flow diagram illustrating a method for autonomous synchronous rendering of media objects, according to a preferred embodiment of the invention.

FIG. 6 is a flow diagram illustrating a method for autonomous synchronous rendering of media objects, according to a preferred embodiment of the invention.

The method may begin at step 601, wherein project controller 503 may create a project comprising of a plurality of media objects. In an embodiment, the plurality of media objects may be collated by media rendering computer 501 from one or more user devices 550. In the embodiment, one or more user devices 550 may upload the plurality of media objects onto media rendering computer 501, for example, using a software application, a web browser, or a specially configured user computer in communication with a user device 550 (as described in FIG. 7). In an embodiment, the one or more user devices 550, may include mobile devices, smartphones, tablets, cameras, or other media devices. Further, media rendering computer 501 may obtain the plurality of media objects from the one or more user devices 550 via a server, e.g., a remote "cloud" server (e.g., network 701) accessible through the network 310 (e.g., internet or intranet). In some embodiments, the plurality of media objects may be obtained from one or more user devices 550 through messaging services like email and the plurality of media objects may then be uploaded to the remote server using a web browser.

Once the plurality of media objects are received at media rendering computer 501, in a next step 602, project controller 503 may collate a subset of the plurality of media objects within the new project to create a master dataset. In an embodiment, for each new project, the collated subset of media objects may be accessible to each user device 550 through device interface 502.

In a next step 603, media analyzer 504 may initiate media object analysis. In an embodiment, as illustrated, media analyzer 504 may initiate media object analysis for each media object in the master dataset corresponding to the project, using an AI media analysis model (described in greater detail in FIG. 8). In one embodiment, once the plurality of media objects are collated in the master dataset, media analyzer 504 may analyze each of the plurality of media objects so as to ensure autonomous editing of the plurality of media objects to create a synchronized media object. In one embodiment, media analyzer 504 may identify audio and/or video elements common to one or more media objects, to determine whether the identified elements correspond to the same real-world time. Further, based on such determination, one or more media objects may be synchronized by media analyzer 504 accordingly. In another embodiment, media analyzer 504 may perform identification of physical objects, humans, articles, locations, and the like in a media object, allowing a subset of media objects to be filtered based on such identification. Such a filtration may be highly beneficial, for example, where a large number of media objects are collected and many of such media objects are irrelevant to a specific user device 550.

Referring again to FIG. 6, in a next step 604, location analyzer 505 may initiate spatial analysis for the media objects comprised within the master dataset corresponding to the project. In an embodiment, location analyzer 505 may perform the spatial analysis using a spatial analysis model, as detailed in FIG. 9. In one embodiment, the spatial analysis algorithm executed by location analyzer 505 initiate extraction of GPS data and gyroscope data from each media object. In the embodiment, each media object is split into frames and GPS data extracted from each frame is stored in media object database 512. Further, location analyzer 505 may also use the spatial analysis algorithm on each frame to perform directionality analysis, wherein location analyzer 505 may check for gyroscope data within a current frame and if such data exists location analyzer 505 may store the data in location database 513.

In a next step 605, audio analyzer 506 may perform audio analysis for the media objects comprised within the master dataset corresponding to the project. In an embodiment, audio analyzer 506 may perform the audio analysis based on an audio analysis model, described in greater detail in FIG. 10. In one embodiment, using the audio analysis algorithm audio analyzer 506 may stream a media object to be analyzed for audio content. In case audio analyzer 506 determines that a corresponding audio exists, an audio file will be split from the media object to undergo metadata analysis. Further, each such audio file may be provided with an audio score by audio analyzer 506, as described in the description that follows. In another embodiment, audio analyzer 506 may perform spectrum analysis for each audio file and the results of said spectrum analysis may be inputted by audio analyzer 506 into a convolutional neural network trained to statistically isolate one or more features from the audio files. This may be done to ensure that audio analyzer 506 assigns a technical quality score to each audio file track based on statistical relationships, e.g., between frequency patterns and audio quality corresponding to the audio file.

In yet another embodiment, audio analyzer 506 may perform audio diarization for each audio file to produce a textual transcript associated with the audio file. The textual transcript, in an embodiment, may be used by audio analyzer 506 to assign an intelligibility score to the audio file. Finally, audio analyzer 506 may determine a resulting weighted audio score for each audio file based on successful diarization of the audio file, the technical quality score, and the intelligibility score. Based on average of such scores, audio selector 507 may select the best audio file for the synchronized media object.

Referring again to FIG. 6, in a next step 606, narrative sequence generator 510 may generate a sequence structure for the project. In one embodiment, the sequence structure for the project may be created by media analyzer 504 by initiating a sequence generation model, as detailed in FIG. 11. In the embodiment, the sequence structure may be assigned to the project based on a project template to fill possible matches of media objects within media object slots associated with the selected project. In an embodiment, sequence structure data may include an array of empty media object slots defining the number of clips, the length of each clip, label data associated with corresponding frames relevant for the media object slot, possible transitions between media object slots, and relevant backing audio tracks.

In a next step 607, narrative sequence generator 510 may determine whether the sequence structure is approved. In an embodiment, the determination of approval of the generated sequence structure may be determined by narrative sequence generator 510, based at least on a notification indicative of selection of the sequence structure by a user device 550 currently working on the project.

In case it is determined by narrative sequence generator 510 that the sequence structure is disapproved, the method may continue to step 606, wherein another sequence structure may be generated by narrative sequence generator 510. Otherwise, in a next step 608, narrative sequence generator 510 may create a narrative sequence, as detailed in FIG. 11. In an embodiment, narrative sequence generator 510 may store the narrative sequence within sequence database 514. In one embodiment, narrative sequence generator 510 may create a narrative sequence by initially loading a project template defining empty temporal media object slots and one or more aesthetic features, e.g., relevant background audio tracks, title cards, and transitions, for each media object. According to the embodiment, such project templates may be generated by media rendering computer 501 and/or obtained from one of user devices 550 or from a template generation neural network pre-trained on existing project templates, user-created templates, and/or user feedback. In another embodiment, once all media object slots have been analyzed by narrative sequence generator 510, and unfilled media objects slots are determined, narrative sequence generator 510 may mark the narrative sequence as incomplete. In such a scenario, one or more user devices 550 may be prompted by narrative sequence generator 510 to either upload more media objects and/or to change project configuration settings.

Referring back to FIG. 6, in a next step 609, narrative sequence generator 510 may determine whether the narrative sequence is approved. In case it is determined by narrative sequence generator 510 that the narrative sequence is not approved, the method may continue to step 608, wherein narrative sequence generator 510 may create another narrative sequence based on further media objects uploaded by user device 510 and/or changes in project configuration settings.

Otherwise, if the narrative sequence is approved, in a next step 610, preview generator 509 may create a synchronized media object preview. In an embodiment, preview generator 509 may create the synchronized media object preview using a video preview model, as described in FIG. 12. Further, the synchronized media object preview may be stored in media object database 512. Further, in a next step 611, project controller 503 may transmit the narrative sequence to a graphical user interface of user device 550.

Figure 7:
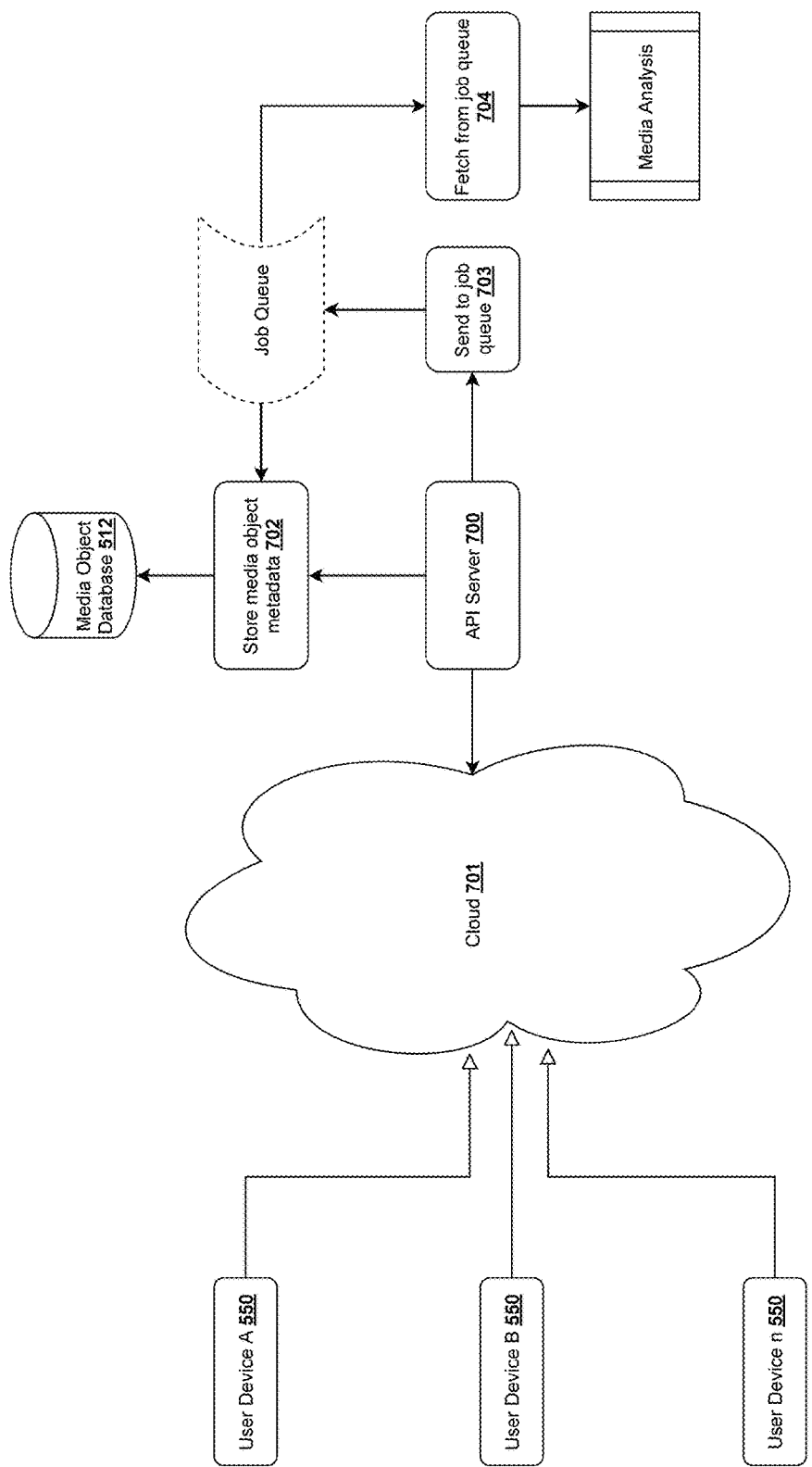
FIG. 7 is a block diagram illustrating collation of media objects from one or more media sources, according to a preferred embodiment of the invention.

FIG. 7 is a block diagram illustrating collation of media objects from one or more media sources, according to a preferred embodiment of the invention.

As illustrated, one or more user devices, i.e., user device A 550 user device n 550 may join a project running at media rendering computer by uploading one or more media objects using remote cloud network 701. In an embodiment, media rendering computer 501 may support many user device types as well as file formats for media objects. In another embodiment, media objects may be obtained by media rendering computer 501 directly at remote cloud 701 through a dedicated application running at user device 550.

In an embodiment, when one or more media objects are received from user devices 550, project controller 503 may ascertain which media objects pertain to particular projects, created at media rendering computer 501. In the embodiment, project controller 503 may create the projects based on predefined information such as project templates (e.g., extracted from external services 540), user preferences, and/or configuration settings. Further, each media object, through an API server 700, may either be uploaded to a job queue (step 703) or stored in media object database 512 (step 702). Further, all media objects uploaded to the job queue may also be eventually stored at the media object database 512 by project controller 503.

In step 704, project controller 503 may fetch each media object for the project from the job queue. In an embodiment, each media object may then undergo media analysis, including but not limited to, media object analysis, audio analysis, location analysis, metadata analysis, and the like as described in FIGS. 8-13.

FIG. 8 is a flow diagram illustrating a method for media object analysis, according to a preferred embodiment of the invention.

The method may begin at step 801, wherein project controller 503 may fetch a project from a project queue, as illustrated. In a next step 802, media analyzer 504 may stream media objects associated with the project from a cloud storage and/or the master dataset. In an embodiment, for each different project, media analyzer 504 may create a separate master dataset, such that each master dataset contains media objects, each associated with a given project and sourced from one or more user devices 550. In the embodiment, the media objects may contain video files, audio files and/or audio-video files in different file formats. Once the master dataset is created by project controller 503, each media object may be standardized by media analyzer 504 to a predetermined file format, based on different project themes as well as other user defined preferences.

In a next step 803, media analyzer 504 may identify metadata for each of the streamed media objects. In an embodiment, the metadata may include statistics associated with each media object, including but not limited to, file format, bitrate, framerate, codec, frame count, stream size, rotation, encoding, and the like. In the embodiment, the metadata may be extracted and processed by media analyzer 504 using open-source tools such as MediaInfo™ and/or using one or more pre-trained algorithms to automatically extract technical metadata from each media object as they are streamed from the master dataset. In a next step 804, media analyzer 504 may store the identified metadata for each media object in metadata database 511, as shown.

In a next step 805, media analyzer 504 may generate a proxy of each media object. In one embodiment, media analyzer 504 may generate the proxy for each media object to ensure that the media objects are encoded, e.g., for web-based applications and usages. In the embodiment, media analyzer 504 may create the proxy to act as a firewall and/or a web filter as well as provide network connections that may be shared between multiple user devices 550. In another embodiment, media analyzer 504 may create the proxy to ensure that cache data may be provided to user devices 550 in order to resolve network requests in a faster manner as well as facilitate a higher level of privacy for user devices 550 communicating with media object rendering computer 501.

In a next step 806, media analyzer 504 may split each media object into individual frames. Typically, media object frames (herein interchangeably referred to as 'frames') may comprise of spatial information in the form of lines within a signal. In instances where the media object contains video, there may be two different types of videos frames—progressive I-frames and progressive P-frames containing lines starting from a first given time instance and progressing through successive lines to the bottom of each frame. Further, a progressive I-frame may be an intra-coded frame, while a progressive P-frame may be a frame that is coded using positive prediction. The frames may also be of a progressive B-frame type, that is, frames may be coded using bi-directional prediction.

In a next step 807, media analyzer 504 may determine whether any frames are remaining. If it is determined by media analyzer 504 that no frames are remaining, in a next step 808, media analyzer 504 may initiate media object analysis for each frame. In an embodiment, the media object analysis may be inclusive of the spatial analysis model, the audio analysis model, and metadata analysis, as described in further detail with respect to FIGS. 9-12. The method may then continue to step 813 through 816.

Referring again to step 807, in case it is determined by media analyzer 504 that frames are still remaining, in a next step 809, media analyzer 504 may split and format each such frame. In an embodiment, for remaining frames, each individual frame may be isolated and reformatted by media analyzer 504 for analysis by cropping and resizing the frame in order to standardize it as well as preparing said frame for inputting into later input into three neural networks: the Action Recognition Neural Network, the Object Recognition Neural Network, and the Facial Recognition Neural Network.

In a next step 810, media analyzer 504 may add the media object frames to an activity clip. In an embodiment, the activity clip may comprise multiple frames of a given media object, each frame indicative of one or more instances in an event described by the media object, as received from multiple user devices 550. For instance, in one embodiment, wherein the event is a sporting event, and the media object comprises of a video of a particular play within the sporting event, each individual frame of the video may be indicative of images or snapshots from of the same play, however, as received from different user devices 550. Each individual frame may differ in terms of camera angles, video quality, audio track, playback length, and the like.

In a next step 811, media analyzer 504 may determine whether the clip size for the activity clip is greater than equal to a predetermined threshold. In case it is determined by media analyzer 504 that the clip size is not greater than equal to the predetermined threshold, the method may continue to step 807, wherein more media object frames may be searched. In an embodiment, the predetermined threshold may be determined by media analyzer 504 based on different projects and their associated project templates. For each project template, media analyzer 504 may assign a minimum length of the activity clip, such that further analysis of the frame results only when the minimum length of the activity clip is realized. In another embodiment, the predetermined threshold may be determined by media analyzer 504 in terms of number of frames, such that each activity clip at least comprises the predetermined number of frames before further processing.

In case it is determined by media analyzer 504 that activity clip size is greater than or equal to the predetermined threshold, in a next step 812, media analyzer 504 may initiate action recognition for each media object frame using an action recognition neural network. In one embodiment, the action recognition neural network when executed by media analyzer 504 may pass a blob of the multi-frame data, associated with each frame, to a ResNet 34 convolutional neural network, that may have been pre-trained by media analyzer 504 on kinetics data. In an embodiment, media analyzer 504 may train the action recognition neural network using one or more of labeled media objects comprising kinetic actions, such that the action recognition neural network may be configured to detect actions relevant to the given project template. In several embodiments, the actions may comprise of human activities such as "riding a bike" or "blowing out candles", such that data on these actions may be received by media analyzer 504 as an output from the action recognition neural network in the form of action labels. The action labels may be stored by media analyzer 504 in label database 515. Once the action recognition neural network is executed by media analyzer 504, the method may continue to step 813.

In a next step 815, media analyzer 504 may process each frame to undergo an object recognition, using an object recognition neural network. In one embodiment, the object recognition neural network may comprise of an instance of the Single Shot MultiBox Detector (SSD) neural network that may be pre-trained by model creator 508 to recognize one or more objects relevant to the project as dictated by their corresponding project template. In an embodiment, the project template may be indicative of an event, occasion, and/or experience to which the project and media objects corresponding thereto relate to. In several embodiments, the project templates may be created by user devices 550, extracted from external services 540, or a combination thereof.

In an embodiment, based on the execution of the object recognition neural network by media analyzer 504, one or more object matches within a given frame to the project template, may be recorded by media analyzer 504 using an object label. In the embodiment, the object label may be recorded by media analyzer 504 at a particular timestamp at which the object match is found within the frame. Further, the object label may be indicative of a textual description of the object found in the match. The object labels may be stored by media analyzer 504 in label database 515. The method may then continue to step 816.

In step 816, media analyzer 504 may execute the facial recognition neural network for each identified frame. In an embodiment, once all object matches have been recorded by media analyzer 504, an execution process similar to image recognition neural network may be executed by media analyzer 504 for identification of facial recognition data. In the embodiment, each frame may be fed into the facial recognition neural network, e.g., another SSD network, that may have been pre-trained by model creator 508 on human facial data. In an embodiment, the output of the facial recognition neural network may comprise of an array of face labels, each face label identifying a human face within the frame. The face labels may be stored by media analyzer 504 in label database 515.

Referring now to step 813, media analyzer 504 may collect action tags and bounding box data based on outputs from each of action recognition neural network, object recognition neural network, and facial recognition neural network. In an embodiment, the action tags may be indicative of a given action performed within an instance of a frame along with data related to one or more objects recognized during the performed action and one or more human faces identified during the performed action. Further, in another embodiment, the bounding box data for the frame may be indicative of an area within the frame where the action and corresponding objects and human faces are found. The action tags and bounding box data, in one embodiment, may be stored by media analyzer 504 in label database 515.

In a next step 814, media analyzer 504 may determine confidence scores, for outputs of each neural network, i.e., action recognition neural network, object recognition neural network, and facial recognition neural network. In an embodiment, each confidence score may be indicative of a quantified quality factor associated with an action label, an object label, and a face label at a given timestamp in a frame. The confidence score for each label may be stored by media analyzer 504 in media object database 512, with their respective timestamps, such that each confidence score may be used to determine an inclusion or exclusion of a frame in a synchronized media object, as described in the description that follows.

FIG. 9 a flow diagram illustrating a method for spatial analysis of media objects, according to a preferred embodiment of the invention.

The method may begin at step 901, wherein media object spatial analysis may be initiated by project controller 503. In one embodiment, the spatial analysis for the media objects may be initiated by project controller 503, by executing the spatial analysis neural network. In a next step 902, location analyzer 505 may determine whether any frames are remaining to be streamed from the media objects. In response to a determination that no frames are remaining, beginning from step 903, location analyzer 505 may determine media object spatial analysis results.

In an embodiment, the results for the spatial analysis may be determined by location analyzer 505 based on execution of steps 910-913, for each identified frame within a media object. In the embodiment, at step 910, location analyzer 505 may map bounding box data as well as action labels, object labels, and face labels for a current frame under processing, as stored in label database 515, described in the foregoing. In an embodiment, for the current frame, the bounding box data may be indicative of a space within the frame wherein each label has been identified. Further, mapping the bounding box data by location analyzer 505 may also comprise associating corresponding timestamps with bounding boxes wherein labels are identified.

Based on the mapping of bounding box data and labels, in a next step 911, location analyzer 505 may determine which matching labels and bounding box data for the frame contains global positioning satellite (GPS) data. In an embodiment, one or more labels, along with their respective bounding boxes may be processed by location analyzer 505 to determine coordinate information. In one embodiment, the coordinate information may be determined by location analyzer 505 by executing a pre-trained neural network model and/or deploying specially designed code (e.g., a Python® script) to extract longitude and latitude information.

In a next step 912, location analyzer 505 may determine whether at least one matching label and respective bounding box data is found for the frame. In response to a determination that no matching label and bounding box data is found, in a next step 908, location analyzer 505 may mark a location of the frame as unknown. In an embodiment, for unknown GPS locations in the frame, location analyzer 505 may search for other frames having matching labels and bounding box data and if such other frames are found having corresponding GPS data, the bounding box data for the frame with unknown location may be used in order to triangulate an approximate GPS location by comparing bounding box coordinates between the two frames.

Otherwise, in a next step 913, location analyzer 505 may triangulate an approximate GPS location for the frame using the matching labels and bounding box data. In one embodiment, wherein the project comprises of video frames of a basketball game, and location analyzer 505 determines that in a given frame a basketball backboard with bounding box coordinates of (60 px, 40 px) for the upper left corner and (300 px, 500 px) for the bottom right corner is identified along with an overlapping bounding box for a basketball hoop with coordinates of (150 px, 120 px) for the upper left corner and (180 px, 220 px) for the bottom right corner, location analyzer 505 may store these object coordinates in location database 513 for comparison with other frames in order to triangulate an estimated GPS location for the current frame.

In a next step 914, based on the analysis of the matching labels and bounding box data, location analyzer 505 may store the GPS data for the frame in location database 515.

Referring back to step 902, in case it is determined by location analyzer 505 that more frames are remaining for analysis, in a next step 904, location analyzer 505 may split and format each such frame. In an embodiment, for remaining frames, each individual frame may be isolated and reformatted by location analyzer 505 for analysis by cropping and resizing the frame in order to standardize it as well as preparing said frame for inputting into spatial analysis neural network such that location analyzer 505 may analyze coordinate locations, as depicted in step 905.

In a next step 906, location analyzer 505 may determine whether GPS data is available for each frame of the remaining frames. In response to a determination that GPS data is available for one or more frames, location analyzer 505 may save the GPS data as respective frame location for the one or more frames, as described in step 909. Otherwise, in a next step, location analyzer 505 may determine whether label data is available for one or more frames, for which GPS data was unavailable. In one embodiment, as described in the foregoing, the label data may include action labels, object labels, and facial labels along with corresponding bounding box data. If it is determined by location analyzer 505 that no label data is available for a given frame, in step 908, location analyzer 505 may save the frame location as unknown. Otherwise, the method may continue through steps 910-913, wherein approximate GPS locations for each frame, where label data is available, may be triangulated by location analyzer 505.

Once available GPS location for one or more frames are computed and stored by location analyzer 505, in a next step 914, location analyzer 505 may analyze the directionality of each frame. For each frame, beginning at step 915, location analyzer 505 may determine whether gyroscope data is available. In one embodiment, location analyzer 505 may determine the gyroscope data by lining up data, such as in GPMF format, with a current frame. In case such data is found, location analyzer 505 may store the gyroscope data as frame directionality data for the frame, in step 916.

Otherwise, in a next step 917, location analyzer 505 may determine whether label data along with corresponding bounding box data is available for the frame. In case it is determined by location analyzer 505 that no label data is found, in a next step 918, location analyzer 505 may store the directionality data for the frame as unknown, within location database 515. Otherwise, in a next step 919, location analyzer 505 may map the label data with corresponding bounding box data for the frame. In an embodiment, for each label and corresponding bounding box data, location analyzer 505 may map bounding box data as well as action labels, object labels, and face labels for a current frame under processing, as stored in database location analyzer 505. In an embodiment, for the current frame, the bounding box data may be indicative of a direction from a starting coordinate within the frame wherein each label has been identified. Further, mapping the bounding box data by location analyzer 505 may also comprise associating corresponding timestamps with bounding boxes wherein labels are identified.

Once the mapping of labels and bounding boxes is done, in a next step 920, location analyzer 505 may identify other frames having matching labels and gyroscope data are available corresponding to the current frame being analyzed. In a next step 921, location analyzer 505 may determine whether other such frames are identified. In case no other such frames are identified, the method may terminate.

Otherwise, in a next step 922, location analyzer 505 may triangulate an approximate directionality for the current frame. In one embodiment, wherein the project comprises of video frames of a basketball game, location analyzer 505 may identify and label two basketball players in one media object frame, wherein Player A may be on a left side of the frame and Player B is on a right side of the frame. In the embodiment, if location analyzer 505 identifies existing gyroscope data indicating the media object frame is oriented in a westward direction, location analyzer 505 using the labels and gyroscope data may further identify another media object frame with Player B on the left and Player A on the right to be oriented in an eastward direction, with more specific directionality determined by bounding box sizes.

FIG. 10 is a flow diagram illustrating a method for audio analysis for the media objects, according to a preferred embodiment of the invention.

The method may begin at step 1001, wherein project controller 503, may initiate media object audio analysis. In an embodiment, project controller 503, may initiate media object audio analysis by executing the audio analysis neural network.

In a next step 1002, audio analyzer 506 may collect one or more media objects from the master dataset, corresponding to a given project selected by user device 550. In a next step 1003, audio analyzer 506 may determine whether a given media object comprises of one or more audio tracks. In case it is determined by audio analyzer 506, that there are no audio tracks available, in a next step 1004, audio analyzer 506 may mark the media object as mute. The method may then continue to step 1002, wherein more media objects may be collected by audio analyzer 506 from the master dataset.

However, in case it is determined by audio analyzer 506 that the current media object contains at least one audio track, in a next step 1006, audio analyzer 506 may split the at least one audio track from the media object. In an embodiment, audio analyzer 506 may further format the split audio track to a predetermined format based on the project configuration settings as well as user device 550 preferences.

In a next step 1006, audio analyzer 506 may extract metadata from the audio track. In one embodiment, the metadata for the audio track may include information such as channel configuration, file encoding, sample rate, bit depth, audio codec, bitrate, and the like. In an embodiment, audio analyzer 506 may store the extracted metadata in metadata database 511.

In a next step 1007, audio analyzer 506 may assign a bitrate score and sample rate score for the audio track. In one embodiment, based on numeric values of the bitrate and sample rate as found in a header of the audio track, audio analyzer 506 may assign a bitrate score and a sample rate score to the audio track, e.g., between values 0 and 1. For example, bitrates of 320 Kbps or higher may be assigned a bitrate score close to 1, whereas bitrates of 96 Kbps or lower may be assigned bitrate scores of 0.5 or less. Likewise, audio sample rates of 96 kHz or higher may be assigned a sample rate score close to 1, whereas sample rates below 44.1 kHz may be assigned sample rate scores of 0.5 or less. In one embodiment, audio analyzer 506 may compute an average of the bitrate score and sample rate score for the given audio track to produce one bitrate/sample rate score and store the same in metadata database 511.

In an embodiment, audio analyzer 506 may use the extracted metadata for further analysis of the audio track by executing spectrum analysis using a spectral analysis quality model, as depicted in step 1008. In an embodiment, for the spectrum analysis audio analyzer 506 may format the audio track and input the audio track to ffmpeg tool which may produce a binary frequency data output file which, in some embodiments, may be stored by audio analyzer 506 locally, e.g., in metadata database 511 and/or remotely over the cloud for future processing.

In a preferred embodiment, audio analyzer 506 may input the binary frequency data output file into a convolutional neural network (CNN) that may have been trained by model creator 508 on a plurality of frequency data output files of varying quality levels. In an embodiment, each of the frequency data output files may be previously tagged by project controller 503 for quality using Amazon® Mechanical Turk and/or other crowdsourcing platforms. The CNN, in an embodiment, may allow for statistical isolation of features such as noise and frequency from the frequency data output files.

Further, in a next step 1009, audio analyzer 506 may assign a technical quality score to the audio track based on statistical relationships between frequency patterns and audio quality, as determined by the CNN. The technical quality score, in one embodiment, may be stored by audio analyzer 506, in metadata database 511.

In a next step 1010, audio analyzer 506 may diarize the audio track. In an embodiment, audio analyzer 506 may perform diarization of the audio track using an audio diarization model. In one embodiment, the audio diarization model may comprise of a deep recurrent neural network to analyze the audio track and produce a resulting textual transcript. According to the embodiment, the input to the audio diarization model may be the audio track and if the transcription process succeeds, the output of the audio diarization model may comprise of an array of transcribed words which are timestamped to points in the media object to which the audio track belongs.

In a next step 1011, audio analyzer 506 may determine whether a successful transcription process was executed based on the audio diarization model. In case it is determined by audio analyzer 506 that a successful transcription process was executed, i.e., a transcript is available, in a next step 1013, audio analyzer 506 may store the transcription data comprising of words and corresponding timestamps in metadata database 511. Otherwise, in a next step 1012, audio analyzer may record a failure of the transcription process by the audio analyzer model.

Referring again to step 1013, wherein the generated transcript of words and corresponding timestamps are stored by audio analyzer 506, in a next step 1014, audio analyzer 506 may run a transcript clarity analysis. In an embodiment, audio analyzer 506 may run the transcript clarity analysis using a natural language processing (NLP) model, as depicted. In the embodiment, audio analyzer 506 may combine an array of words within the transcription of words, combine the array of words into singular text, and input the singular text to a neural network, e.g., a Long Short Term Memory neural network (LSTM). In an embodiment, the LSTM network may be trained by model creator 508 on a plurality of diarized text files of varying clarity levels, that have been tagged by model creator 508 for clarity via Amazon® Mechanical Turk and/or other crowdsourcing platforms.

In one embodiment, based on an output of the LSTM, the transcription of words may be assigned a clarity score by audio analyzer 506, as shown in step 1015. Further, a resulting weighted audio score may be calculated for the audio track (and thereby the corresponding media object) by audio analyzer 506 such that if the audio track was diarized successfully, the bitrate/sample rate score is worth 30%, the technical quality is worth 30%, and the diarized quality is worth 40%. Otherwise, the bitrate/sample rate score and the technical quality score may be averaged and 30% score may be deducted.

FIG. 11 is a flow diagram illustrating a method for creating a narrative sequence, according to a preferred embodiment of the invention.

The method may begin at step 1101, wherein project controller 503 may load a project selected by a user device 550. In a next step 1102, narrative sequence generator 510 may assign a sequence structure to the selected project. In one embodiment, narrative sequence generator 510 may execute a narrative creation algorithm by firstly using a project template associated with the selected project and defining empty temporal clip slots and one or more of aesthetic considerations, such as relevant background audio tracks, title cards, and transitions; project configuration settings, and user device preferences.

In an embodiment, the project templates may be extracted by media rendering computer 501 from defaults templates locally stored at media object database 512, templates created by user device 550, and/or templates generated by a template generation neural network trained by model creator 508 on existing templates, user-created templates, and/or user feedback. In the embodiment, as narrative sequence generator 510 initializes the narrative creation algorithm, a sequence structure may be assigned based on the selected project template that may be used by narrative sequence generator 510 to fill possible matches of media objects associated with the selected project from the master dataset. In an embodiment, sequence structure data may include an array of empty media object slots defining the number of clips, the length of each clip, label data associated with corresponding frames relevant for the media object slot, possible transitions between media object slots, and relevant backing audio tracks that may be aggregated by narrative sequence generator 510, as depicted in step 1103.

In a next step 1104, narrative sequence generator 510 may initialize a sequence search algorithm beginning at step 1125, wherein narrative sequence generator 510 may determine whether there are empty media object slots within the sequence structure. In response to a determination by narrative sequence generator 510 that there are empty slots within the sequence structure, in a next step 1104, narrative sequence generator 510 may iterate over each empty media object slot and select a possible video/image match from the master dataset. The method may then continue to step 1110. Otherwise, in case it is determined by narrative sequence generator 510 that no empty media slots are identified, in a next step 1106, narrative sequence generator 510 may further determine whether all media objects slots are filled. If all media object slots are not filled, in a next step 1107, narrative sequence generator may mark the narrative sequence as incomplete. In such a scenario, project controller 503 may solicit additional media objects for the project from one or more user devices 550.

However, in case it is determined by narrative sequence generator 510 that all media object slots are filled, in a next step 1108, narrative sequence generator 510 may further determine whether a sequential timeline is enforceable for the project template associated with the project for which the narrative sequence structure is being created by narrative sequence generator 510. In an embodiment, wherein the project template corresponds to a 'wedding ceremony', one or more video clips in the final synchronized media object must appear in a particular order so that they tell a narrative, e.g., video clips from the reception should not appear before any clips from the ceremony.

In response to a determination by narrative sequence generator that no sequential timeline is enforceable, in a next step 1109, narrative sequence generator 510 may save the narrative sequence in sequence database 514. Otherwise, narrative sequence generator 510 may initialize a narrative sequence analysis. The method may then continue to step 1114.

Referring again to step 1105, once a video/image candidate is selected from the master dataset, in a next step 1110, narrative sequence generator 510 may determine whether more media objects are remaining for processing. In response to a determination by narrative sequence generator 510 that no more media objects remain, in a next step 1111, narrative sequence generator 510 may begin execution of the next media object slot. The method may then continue to step 1125.

Otherwise, in a next step 1112, narrative sequence generator 510 may determine fuzzy search data for action, object, and facial recognition. In an embodiment, for determining the data associated with action, object, and facial recognition, narrative sequence generator 510 may perform a fuzzy logic search for each media object slot to determine label data, bounding box data, and corresponding timestamps for each frame of each media object within a media object slot. Based on the search, in a next step 1113, narrative sequence generator 510 may determine whether there are any matches for data associated with the action, object, and facial recognition (label data). If data is found, in a next step 1116, the frame may be marked as a possible frame match, along with a confidence level, to be included within the media object slot. Otherwise, the method continues to step 1114.

In step 1114, for each frame wherein no matching label data is found, narrative sequence generator 510 may search the master dataset for timeline, location, and directionality data, calculated as described in the foregoing. In a next step 1115, narrative sequence generator 510 may further determine whether such a match is found. If no match is found for a given frame, the method may continue to step 1117.

However, if data match is found, in a next step 1116, the given frame may be added as a potential match to the media object slot. Further, in a next step 1121, narrative sequence generator 510 may again determine whether a sequential timeline is enforceable. If no timeline is enforceable, in a next step 1122, narrative sequence generator may store the media object, comprising one or more media object frames as processed above, to be included in the narrative sequence. However, if a timeline is enforceable, in a next step 1123, narrative sequence generator may determine whether each given frame fits the enforceable timeline. If one or more frames match the enforceable timeline, in step 1122, narrative sequence generator 510 may store the media object, comprising the one or more frames as processed above, to be included in the narrative sequence. Otherwise, in a step 1124, narrative sequence generator 510 may begin processing of the next media object. The method may then continue to step 1105.

Referring again to step 1115, in case no match is found for timeline, location, and directionality, in step 1117, narrative sequence generator 510 may search the master dataset for timeline and location match, i.e., disregard search for a directionality match. In a next step 1118, narrative sequence generator 510 may determine if a match is found. If a match is found, the method may continue to step 1116, wherein the given frame may be added as a potential match to the media object slot. Otherwise, in a next step 1119, narrative sequence generator 510 may search the master dataset for timeline, i.e., disregard search for the directionality match and location match. If a match is found, the method may continue to step 1116, wherein the given frame may be added as a potential match to the media object slot. Otherwise, the method may continue to step 1105, wherein another video/image candidate is selected from the master dataset.

FIG. 12 is a flow diagram illustrating a method for audio selection and correlation for the media objects, according to a preferred embodiment of the invention.

The method may begin at step 1201, wherein audio selector 507 may initiate a narrative sequence audio selection process. In one embodiment, the audio selection by audio selector 507 may occur after a narrative sequence has been saved by narrative sequence generator 510 and may be used to determine if better possible audio tracks containing the same content as the media object selected for the narrative sequence, are available.

Beginning at step 1202, audio selector 507 may determine whether one or more media object slots within the narrative sequence have no audio track assigned. In case it is determined by audio selector 507 that no such media slots are remaining, in a next step 1204, audio selector 507 may store the final audio selection for the narrative sequence, i.e., an audio track comprising a combination of audio tracks from each media object slot.

However, in case it is determined by audio selector 507 that one or more media object slots have no audio tracks assigned, in a next step 1203, audio selector 507 may identify one or more audio tracks based on timestamps associated with each media object slot. In a next step 1205, audio selector 507 may determine whether an audio track selected from the one or more identified audio tracks has a highest average audio score, i.e., a resulting weighted audio score based on successful diarization of the audio file, the technical quality score, and the intelligibility score. Alternatively, the audio score may be determined also based on a fuzzy search of the diarization transcript.

In response to a determination by audio selector 507 that the selected audio track has the highest audio score, in a next step 1212, the audio track may be saved as the final audio track for the narrative sequence. The method may then continue to step 1201. Otherwise, in a next step 1206, audio selector 507 may perform an audio track match search. In an embodiment, the audio track match search may be performed by audio selector 507 to identify other possible audio tracks, associated with a particular timestamp and content that may have a higher audio score.

In a next step 1207, audio selector 507 may determine whether a base audio track transcript is available. If no such transcript is available, in a next step 1211, audio selector 507 may determine whether the selected audio track matches with an enforceable timeline. If there is a match, the method may continue to step 1212, wherein the audio track may be saved as the final audio track for the narrative sequence. Otherwise, the method may continue to step 1202, wherein more media object slots may be found by audio selector 507.

Referring back to step 1207, if the base track transcript is available, in a next step 1208, audio selector 507 may perform a search for diarized transcript for the base track. Further, in a next step 1209, audio selector 507 may determine if a fuzzy match between at least one of the other one or more audio tracks and the diarized transcript content is found. If such a match is found, in a next step 1210, audio selector 507 may further determine whether the at least one audio track has the highest audio score. If it is determined that the at least one audio track has the highest audio score, the method may continue to step 1212, wherein the at least one audio track and associated timestamp may be marked as optimal audio track for the media object slot by audio selector 507. Otherwise, the method may continue to step 1202, wherein more media object slots may be found by audio selector 507. Once all media object slots are identified, the method may terminate.

FIG. 13 is a flow diagram illustrating a method for creating an editable preview comprising at least a synchronized media object, according to a preferred embodiment of the invention.

The method may begin at step 1301, wherein preview generator 509 may obtain narrative sequence details and audio selection results associated with a current project, respectively from sequence database 514 and metadata database 511. In a next step 1302, preview generator 509, may download selected media objects comprised within the narrative sequence from one or more internal storages within media rendering computer 501 and/or from a remote cloud.

In a next step 1303, preview generator 509 may determine whether the project template associated with the current project requires an audio backing track, e.g., a pre-selected musical track. In case it is determined by preview generator 509 that a backing track is required, in a next step 1304, preview generator may replace the narrative sequence audio track with the identified backing track. The method may then continue to step 1310.

Otherwise, in a next step 1305, preview generator 509 may determine if a system selected audio track is identified. In an embodiment, the system selected audio track may be present based on analysis as described in FIG. 12. If it is determined by preview generator 509 that the system selected audio track is identified, in a next step 1306, preview generator 509 may strip original audio track from the narrative sequence and replace the original audio track with the system selected audio track. Otherwise, in a next step 1307, preview generator 509 may keep the original audio track intact.

In a next step 1307, preview generator 509 may concatenate all audio tracks from all media object slots to generate a final synchronized audio track. Further, in a next step 1309, preview generator 509 may concatenate all other audio tracks, media object frames, and images based on the media object sequence.

In a next step 1310, using all concatenated audio, media object frame, and image files, preview generator 509 may generate a synchronized media object preview to be transmitted to graphical user interfaces of one or more user devices 550. In one embodiment, the synchronized media object preview may be compressed for web viewing by preview generator 509.

FIG. 14 is a flow diagram illustrating an exemplary neural network for determining elements comprised within a plurality of media object segments in accordance with some embodiments of the invention. According to the embodiment, methods described herein process media objects which may be analyzed as a sequence of images (frames) together. Specifically, a plurality of media object segments used herein are not only a sequence of images, but rather a sequence of related images, that is, related within a single media object segment and also within a plurality of media object segments (for example, as captured by a plurality of video capture devices). Methods described herein exploit this dimension of images in a multitude of ways that may apply to single images or frames. Further, due to the complexity of media object data, e.g., video data (size, related annotations, and other characteristics) and the expensive computation of training and inference, methods described herein for object/video detection, more precisely, how to explore the temporal dimension of the plurality of objects within media object segments, in an exemplary process, by NN predictor 516, with, for example two input features $X_1$ 1401 and $X_2$ 1402, a plurality of connected hidden layers $A_{1,1}$ 1403-$A_{1,4}$ 1406, $A_{2,1}$ 1407-$A_{2,4}$ 1410, and $A_{3,1}$ 1411-$A_{3,4}$ 1414, with a plurality of nodes in each layer, along with a plurality of outputs, $Y_1$ hat 1415 to $Y_{56}$ hat 3416 representing all possible elements in a media object segment is disclosed. $X_1$ 1401 may represent a definition of object elements (for example objects within a video such as a human subject, physical objects, components of objects, and the like, while $X_2$ 1402 may represent the sequence of time allotments to each change in element.

Time dependent sequential data may be passed through the neural network. At time zero ($t_0$), the first set of input data is fed forward through the network and at $t_1$, a second set of input data is fed forward through the network. Also, at $t_1$, the previous outputs from each node (the to outputs), become an additional input at $t_1$. This process continues through time and depends on the length of the time dependent sequential data. In this way, earlier data in the time dependent sequential data, influences later outputs. While training the neural network, backpropagation through time is used to optimize weights, in order for the neural network to provide more accurate outputs.

The neural network in FIG. 14 may be used to predict, by NN predictor 516, a plurality of elements to be identified within a media object segment, for example to be compared to similar (or the same) elements is other media objects, for example, at a similar time sequence or other commonalities within associated metadata describing each media object segment. The neural network may be designed so that after a certain predetermined number of time steps, the neural network finishes the sequence. The output sequence can then be read by the processor, which then identifies one or more elements within other media object segments.

The skilled person will be aware of a range of possible modifications of the various embodiments described above. Accordingly, the present invention is defined by the claims and their equivalents.

What is claimed is:

1. A system for autonomous rendering of synchronized media objects, the system comprising:
   a network-connected media rendering computer comprising a memory and a processor and further comprising programmable instructions stored in the memory and operating on the processor, the instructions when executed by the processor, cause the processor to:
   obtain, from one or more network-connected user devices, a plurality of unsynchronized media objects, wherein each of the plurality of media objects is associated with at least one project to be executed on the media rendering computer;
   store, each of the plurality of unsynchronized media objects in a master dataset corresponding to a project to which an unsynchronized media object relates to;
   initialize a media object analysis procedure for each unsynchronized media object, wherein the unsynchronized media object analysis procedure at least comprises collecting metadata associated with the unsynchronized media object;
   determine a plurality of labels for each unsynchronized media object based on the collected metadata, wherein the plurality of labels at least comprise object labels, facial labels, and action labels;
   execute audio analysis for at least one audio track associated with each unsynchronized media object to determine an audio score, wherein the audio score is determined based on audio metadata associated with the at least one audio track and the plurality of labels;
   select a best audio track corresponding to each unsynchronized media object based on the determined audio score;
   create a narrative sequence comprising of media object slots, each media object slot filled with unsynchronized media objects and corresponding best audio track linked to each media object;
   determine whether the narrative sequence is approved by at least one user device from the one or more user devices;
   in response to a determination that the narrative sequence is approved by at least one user device, generate a synchronized media object preview; and
   transmit the synchronized media object preview to the graphical user interface of the at least one user device;
   identify a subset of one or more media objects each pertaining to at least one project, wherein projects are created based on predefined information comprising one of project templates, user preferences, and configuration settings;
   upload each unsynchronized media object to one of a job queue and media object database;
   initialize the media object analysis procedure for each unsynchronized media object, comprising one or more of a media object analysis, the audio analysis, a location analysis, and a metadata analysis;
   wherein to initialize the location analysis, the programmable instructions when executed by the processor, cause the processor to:
   identify, for each unsynchronized media object, one or more frames contained therein;
   for each frame contained within an unsynchronized media object:
      map bounding box data with data associated with one or more labels from the plurality of labels, wherein the bounding box data is indicative of a space within the frame wherein the at least one label is identified;
      determine whether at least one matching label and respective bounding box data having global positioning satellite (GPS) data is found for the frame; and
      in response to a determination that no matching label and bounding box data is found for the frame, mark a location of the frame as unknown.

2. The system of claim 1, wherein the programmable instructions when further executed by the processor, cause the processor to:

search one or more other frames having matching labels and bounding box data; and if the one or more other frames are found, associate the bounding box data for the frame with unknown location to triangulate an approximate GPS location for the frame.

3. The system of claim 1, wherein to map the bounding box data with data associated with one or more labels, the programmable instructions when further executed by the processor, cause the processor to:

associate corresponding timestamps with bounding boxes wherein the at least label is identified.

4. The system of claim 1, wherein the programmable instructions when further executed by the processor, cause the processor to:

split the at least one audio track from the unsynchronized media object;

format the at least one audio track to a predetermined format based at least on a project configuration setting associated with the project;

extract metadata from the at least one audio track;

assign a bitrate score and a sample rate score to the at least one audio track;

compute an average of the bitrate score and sample rate score for the at least one audio track;

use the extracted metadata to execute spectrum analysis using a spectral analysis quality model, comprising input of at least one audio track to a fast forward Moving Picture Experts Group (ffmpeg) tool to produce a binary frequency data output file;

input the binary frequency data output file into a convolutional neural network (CNN) trained on a plurality of frequency data output files of varying quality levels;

assign a technical quality score to the at least one audio track based at least on statistical relationships between frequency patterns and audio quality associated with the at least one audio track, as determined by the CNN; and determine the audio score for the at least one audio score based on the average of the bitrate score and the sample rate score and the technical score.

5. The system of claim 4, wherein the programmable instructions when further executed by the processor, cause the processor to:

diarize the at least one audio track using an audio diarization model, comprising a deep recurrent neural network, to produce a textual transcript for the at least one audio track, wherein the textual transcript comprises an array of transcribed words, each timestamped to points in the unsynchronized media object to which the at least one audio track belongs; and run a transcript clarity analysis on the textual transcript using a natural language processing (NLP) model, wherein the transcript clarity analysis comprises programmable instructions, that when executed by the processor cause the processor to:

combine the array of transcribed words into singular text, input the singular text into a Long Short Term Memory (LSTM) neural network, wherein the LSTM network is trained on a plurality of diarized text files of varying clarity levels and tagged for clarity, based on an output of the LSTM network, assign a clarity score to the array of transcribed words, and compute a weighted audio score for the audio track based on the clarity score.

6. The system of claim 4, wherein the metadata for the at least one audio comprises information pertaining to channel configuration, file encoding, sample rate, bit depth, audio codec, and bitrate associated with the at least one audio track.

7. The system of claim 4, wherein the CNN enables statistical isolation of features comprising at least noise and frequency information associated with the at least one audio track, from the plurality of frequency data output files.

8. A computer-implemented method for autonomous rendering of synchronized media objects, the method comprising:

obtaining, at a media rendering computer from one or more network-connected user devices, a plurality of unsynchronized media objects, wherein each of the plurality of media objects is associated with at least one project to be executed on the media rendering computer;

storing, by the media rendering computer, each of the plurality of unsynchronized media objects in a master dataset corresponding to a project to which an unsynchronized media object relates;

initializing, by the media rendering computer, a media object analysis procedure for each unsynchronized media object, wherein the unsynchronized media object analysis procedure at least comprises collecting metadata associated with the unsynchronized media object;

determining, by the media rendering computer, a plurality of labels for each unsynchronized media object based on the collected metadata, wherein the plurality of labels at least comprise object labels, facial labels, and action labels;

executing, by the media rendering computer, audio analysis for at least one audio track associated with each unsynchronized media object to determine an audio score, wherein the audio score is determined based on audio metadata associated with the at least one audio track and the plurality of labels;

selecting, by the media rendering computer, a best audio track corresponding to each unsynchronized media object based on the determined audio score;

creating, by the media rendering computer, a narrative sequence comprising of media object slots, each media object slot filled with unsynchronized media objects and corresponding best audio track linked to each media object;

determining, by the media rendering computer, whether the narrative sequence is approved by at least one user device from the one or more user devices;

in response to determining that the narrative sequence is approved by at least one user device, generating, by the media rendering computer, a synchronized media object preview; and transmitting, by the media rendering computer, the synchronized media object preview to the graphical user interface of the at least one user device;

upon obtaining the plurality of unsynchronized media objects, identifying, by the media rendering computer, a subset of one or more media objects each pertaining to at least one project, wherein projects are created based on predefined information comprising one of project templates, user preferences, and configuration settings;

uploading, by the media rendering computer, each unsynchronized media object to one of a job queue and media object database; and initializing, by the media rendering computer, the media object analysis procedure for each unsynchronized media object, comprising one or more of a media object analysis, the audio analysis, a location analysis, and a metadata analysis;

identifying, by the media rendering computer for each unsynchronized media object, one or more frames contained therein;

for each frame contained within an unsynchronized media object:

mapping, by the media rendering computer, bounding box data with data associated with one or more labels from the plurality of labels, wherein the bounding box data is indicative of a space within the frame wherein the at least one label is identified;

determining, by the media rendering computer, whether at least one matching label and respective bounding box data having global positioning satellite (GPS) data is found for the frame; and in response to determining that no matching label and bounding box data is found for the frame, marking, by the media rendering computer, a location of the frame as unknown.

9. The method of claim 8, further comprising:

searching, by the media rendering computer, one or more other frames having matching labels and bounding box data; and if the one or more other frames are found, associating, by the media rendering computer, the bounding box data for the frame with unknown location to triangulate an approximate GPS location for the frame.

10. The system of claim 8, wherein mapping the bounding box data with data associated with one or more labels further comprises:

associating, by the media rendering computer, corresponding timestamps with bounding boxes wherein the at least label is identified.

11. The method of claim 8, further comprising:

splitting, by the media rendering computer, the at least one audio track from the unsynchronized media object;

formatting, by the media rendering computer, the at least one audio track to a predetermined format based at least on a project configuration setting associated with the project;

extracting, by the media rendering computer, metadata from the at least one audio track;

assigning, by the media rendering computer, a bitrate score and a sample rate score to the at least one audio track;

computing, by the media rendering computer, an average of the bitrate score and sample rate score for the at least one audio track;

using, by the media rendering computer, the extracted metadata to execute spectrum analysis using a spectral analysis quality model, comprising input of at least one audio track to a fast forward Moving Picture Experts Group (ffmpeg) tool to produce a binary frequency data output file;

inputting, by the media rendering computer, the binary frequency data output file into a convolutional neural network (CNN) trained on a plurality of frequency data output files of varying quality levels;

assigning, by the media rendering computer, a technical quality score to the at least one audio track based at least on statistical relationships between frequency patterns and audio quality associated with the at least one audio track, as determined by the CNN; and determining, by the media rendering computer, the audio score for the at least one audio score based on the average of the bitrate score and the sample rate score and the technical score.

12. The method of claim 11, further comprising:

diarizing, by the media rendering computer, the at least one audio track using an audio diarization model, comprising a deep recurrent neural network, to produce a textual transcript for the at least one audio track, wherein the textual transcript comprises an array of transcribed words, each timestamped to points in the unsynchronized media object to which the at least one audio track belongs; and executing, by the media rendering computer, a transcript clarity analysis on the textual transcript using a natural language processing (NLP) model, wherein the transcript clarity analysis comprises:

combining, by the media rendering computer, the array of transcribed words into singular text, inputting, by the media rendering computer, the singular text into a Long Short Term Memory (LSTM) neural network, wherein the LSTM network is trained on a plurality of diarized text files of varying clarity levels and tagged for clarity, based on an output of the LSTM network, assigning, by the media rendering computer, a clarity score to the array of transcribed words, and computing, by the media rendering computer, a weighted audio score for the audio track based on the clarity score.

13. The method of claim 11, wherein the metadata for the at least one audio comprises information pertaining to channel configuration, file encoding, sample rate, bit depth, audio codec, and bitrate associated with the at least one audio track.

14. The method of claim 11, wherein the CNN enables statistical isolation of features comprising at least noise and frequency information associated with the at least one audio track, from the plurality of frequency data output files.

* * * * *